US005755992A

United States Patent [19]

Jeffrey et al.

[11] Patent Number: 5,755,992

[45] Date of Patent: May 26, 1998

[54] DETERGENTS CONTAINING A SURFACTANT AND A DELAYED RELEASE PEROXYACID BLEACH SYSTEM

[75] Inventors: Janice Jeffrey, Newcastle upon Tyne; John Scott Park, Whitley Bay; Gerard Marcel Baillely, Newcastle upon Tyne, all of Great Britain

[73] Assignee: The Procter & Gamble Company, Cincinnati, Ohio

[21] Appl. No.: 722,214

[22] PCT Filed: Apr. 3, 1995

[86] PCT No.: PCT/US95/04209

§ 371 Date: Oct. 15, 1996

§ 102(e) Date: Oct. 15, 1996

[87] PCT Pub. No.: WO95/28473

PCT Pub. Date: Oct. 26, 1995

[30] Foreign Application Priority Data

Apr. 13, 1994 [GB] United Kingdom .................... 9407628

[51] Int. Cl.$^6$ ........................................................ C09K 3/00

[52] U.S. Cl. ........................ 252/186.38; 510/312; 510/367

[58] Field of Search ...................................... 510/367, 312; 252/186.38

[56] References Cited

U.S. PATENT DOCUMENTS

| | | | |
|---|---|---|---|
| 4,421,664 | 12/1983 | Anderson et al. | 252/94 |
| 4,444,674 | 4/1984 | Gray | 252/95 |
| 4,634,551 | 1/1987 | Burns et al. | 252/102 |
| 4,818,426 | 4/1989 | Humphreys et al. | 252/99 |
| 5,130,044 | 7/1992 | Mitchell et al. | 252/102 |
| 5,405,412 | 4/1995 | Willey et al. | 8/111 |
| 5,405,413 | 4/1995 | Willey et al. | 8/111 |
| 5,460,747 | 10/1995 | Gosselink et al. | 252/186.38 |
| 5,503,639 | 4/1996 | Willey et al. | 8/111 |
| 5,534,179 | 7/1996 | Miracle et al. | 510/305 |
| 5,552,556 | 9/1996 | Miracle et al. | 548/334.1 |
| 5,662,827 | 9/1997 | Steiger et al. | 510/312 X |
| 5,681,805 | 10/1997 | Schewing et al. | 510/312 X |
| 5,686,015 | 11/1997 | Willey et al. | 510/312 X |

FOREIGN PATENT DOCUMENTS

| | | |
|---|---|---|
| WO 94/27970 | 12/1994 | WIPO . |
| WO 94/28102 | 12/1994 | WIPO . |
| WO 94/28103 | 12/1994 | WIPO . |
| WO 94/28105 | 12/1994 | WIPO . |
| WO 94/28106 | 12/1994 | WIPO . |
| WO 95/00629 | 1/1995 | WIPO . |
| WO 95/29160 | 11/1995 | WIPO . |
| WO 95/29225 | 11/1995 | WIPO . |

*Primary Examiner*—Michael Lusignan
*Attorney, Agent, or Firm*—Ken K. Patel; Kim W. Zerby; Jacobus C. Rasser

[57] ABSTRACT

There is provided a detergent composition containing (a) a surfactant; and (b) an organic peroxyacid bleach source wherein a means is provided for delaying the release to a wash solution of said peroxyacid bleach relative to the release of said surfactant. A pretreat wash method is also provided.

24 Claims, No Drawings

DETERGENTS CONTAINING A SURFACTANT AND A DELAYED RELEASE PEROXYACID BLEACH SYSTEM

This invention relates to detergent compositions containing a surfactant and a source of peroxyacid bleach, wherein a means is provided for delaying the release to the wash solution of said peroxyacid bleach relative to the release of said surfactant.

The satisfactory removal of greasy, coloured soils/stains such as foodstuffs, cosmetics, leather polishes and body soils from soiled/stained substrates is a particular challenge to the formulator of a detergent composition for use in a washing method such as a laundry or machine dishwashing method.

Traditionally, the removal of such this type of soils/stains has been enabled by the use of surface active ingredients and bleach components such as oxygen bleaches, including hydrogen peroxide and organic peroxyacids. The organic peroxyacids are often obtained by the in situ perhydrolysis reaction between hydrogen peroxide and an organic peroxyacid bleach precursor.

A problem encountered with the use of certain organic peroxyacid bleaches in laundry washing methods is a tendency for these organic peroxyacid bleaches to affect the colour stability of the fabrics being washed. Effects on fabric colour stability can include fading of coloured dyes on the fabrics or localised areas of "patchy" bleaching.

The detergent formulator thus faces the dual challenge of formulating a product which maximises bleachable soil/stain removal but minimises the occurrence of any unwelcome fabric colour stability effects of the bleach.

The Applicants have found that the occurrence of any unwelcome fabric colour stability effects arising from the use of organic peroxyacid bleaches in a washing method can be related to the nature of the organic peroxyacid, and also to both the rate of release of the peroxyacid bleach to the wash solution and the absolute level of peroxyacid present in the wash solution.

A fast rate of release of the peroxyacid bleach to the wash solution tends to heighten the probability that unwelcome fabric colour stability effects will be observed, as does a high absolute level of the bleach in the wash solution.

Whilst reducing either the rate of release of the peroxyacid bleach, or the absolute level of the bleach employed in the wash tends to ameliorate this problem, this can be accompanied by a negative effect on the bleachable stain/soil removal ability.

The Applicants have now however found that where a composition containing both a surfactant and a peroxyacid bleach source is employed, and wherein a means is provided for delaying the release to a wash solution of the peroxyacid bleach relative to the release of the surfactant enhanced bleachable stain/soil removal may be obtained.

Additionally, where the composition is used in a laundry washing method a reduction in fabric colour stability problems is also obtained.

The Applicants have in addition found that bleachable stain/soil removal benefits may be obtained when a soiled substrate is pretreated with a solution containing a surfactant, prior to being washed in a method using a bleach containing detergent product.

It is therefore an object of the present invention to provide compositions suitable for use in laundry and machine dishwashing methods having enhanced bleachable stain removal.

It is also an object of the present invention to provide compositions for use in a laundry washing method wherein said compositions show less propensity to cause negative fabric colour stability effects.

It is a related object of the present invention to provide a stain/soil pretreatment method involving pretreating the soiled substrate with a solution containing a surfactant, prior to washing with a bleach-containing detergent product.

SUMMARY OF THE INVENTION

According to the present invention there is provided a detergent composition containing (a) a surfactant; and (b) an organic peroxyacid bleach source wherein a means is provided for delaying the release to a wash solution of said peroxyacid bleach relative to the release of said surfactant such that in the T50 test method herein described the time to achieve a concentration that is 50% of the ultimate concentration of said surfactant is less than 120 seconds and the time to achieve a concentration that is 50% of the ultimate concentration of said peroxyacid bleach is more than 180 seconds.

According to the present invention there is provided a detergent composition containing (a) a surfactant; and (b) an organic peroxyacid bleach source wherein a means is provided for delaying the release to a wash solution of said peroxyacid bleach relative to the release of said surfactant such that in the T50 test method herein described the time to achieve a concentration that is 50% of the ultimate concentration of said surfactant is at least 100 seconds, preferably at least 120 seconds, more preferably at least 150 seconds less than the time to achieve a concentration that is 50% of the ultimate concentration of said peroxyacid bleach.

Said organic peroxyacid bleach source preferably comprises in combination (i) a hydrogen peroxide source; and (ii) a peroxyacid bleach precursor compound According to another aspect of the present invention there is provided a washing method comprising the steps of:

(1) applying a bleach-free solution of a composition containing a surfactant to a soiled substrate;

(2) allowing said solution to remain in contact with said soiled substrate for an effective time interval;

(3) washing said soiled substrate using a washing method involving use of a bleach-containing detergent composition.

Surfactant

The detergent compositions of the invention contain as an essential detergent component a surfactant selected from anionic, cationic, nonionic, ampholytic, amphoteric and zwitterionic surfactants and mixtures thereof.

The surfactant is typically present at a level of from 0.1% to 60% by weight. More preferred levels of incorporation of surfactant are from 1% to 35% by weight, most preferably from 1% to 20% by weight.

The surfactant is preferably formulated to be compatible with any enzyme components present in the composition. In liquid or gel compositions the surfactant is most preferably formulated such that it promotes, or at least does not degrade, the stability of any enzyme in these compositions.

A typical listing of anionic, nonionic, ampholytic, and zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). A list of suitable cationic surfactants is given in U.S. Pat. No. 4,259,217 issued to Murphy on Mar.31, 1981.

Where present, ampholytic, amphoteric and zwitteronic surfactants are generally used in combination with one or more anionic and/or nonionic surfactants.

Anionic surfactant

Essentially any anionic surfactants useful for detersive purposes can be included in the compositions. These can include salts (including, for example, sodium, potassium, ammonium, and substituted ammonium salts such as mono-, di- and triethanolamine salts) of the anionic sulfate, sulfonate, carboxylate and sarcosinate surfactants.

Other anionic surfactants include the isethionates such as the acyl isethionates, N-acyl taurates, fatty acid amides of methyl tauride, alkyl succinates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), N-acyl sarcosinates. Resin acids and hydrogenated resin acids are also suitable, such as rosin, hydrogenated rosin, and resin acids and hydrogenated resin acids present in or derived from tallow oil.

Anionic sulfate surfactant

Anionic sulfate surfactants suitable for use herein include the linear and branched primary alkyl sulfates, alkyl ethoxysulfates, fatty oleyl glycerol sulfates, alkyl phenol ethylene oxide ether sulfates, the $C_5$–$C_{17}$ acyl-N—($C_1$–$C_4$ alkyl) and —N—($C_1$–$C_2$ hydroxyalkyl) glucamine sulfates, and sulfates of alkylpolysaccharides such as the sulfates of alkylpolyglucoside (the nonionic nonsulfated compounds being described herein).

Alkyl ethoxysulfate surfactants are preferably selected from the group consisting of the $C_6$–$C_{18}$ alkyl sulfates which have been ethoxylated with from about 0.5 to about 20 moles of ethylene oxide per molecule. More preferably, the alkyl ethoxysulfate surfactant is a $C_6$–$C_{18}$ alkyl sulfate which has been ethoxylated with from about 0.5 to about 20, preferably from about 0.5 to about 5, moles of ethylene oxide per molecule.

Anionic sulfonate surfactant

Anionic sulfonate surfactants suitable for use herein include the salts of $C_5$–$C_{20}$ linear alkylbenzene sulfonates, alkyl ester sulfonates, $C_6$–$C_{22}$ primary or secondary alkane sulfonates, $C_6$–$C_{24}$ olefin sulfonates, sulfonated polycarboxylic acids, alkyl glycerol sulfonates, fatty acyl glycerol sulfonates, fatty oleyl glycerol sulfonates, and any mixtures thereof.

Anionic carboxylate surfactant

Anionic carboxylate surfactants suitable for use herein include the alkyl ethoxy carboxylates, the alkyl polyethoxy polycarboxylate surfactants and the soaps ('alkyl carboxyls'), especially certain secondary soaps as described herein.

Preferred alkyl ethoxy carboxylates for use herein include those with the formula $RO(CH_2CH_2O)_x\ CH_2COO^{31}\ M^+$ wherein R is a $C_6$ to $C_{18}$ alkyl group, x ranges from O to 10, and the ethoxylate distribution is such that, on a weight basis, the amount of material where x is 0 is less than about 20%, and the amount of material where x is greater than 7, is less than about 25%, the average x is from about 2 to 4 when the average R is $C_{13}$ or less, and the average x is from about 3 to 10 when the average R is greater than $C_{13}$, and M is a cation, preferably chosen from alkalki metal, alkine earth metal, ammonium, mono-, di-, and tri-ethanol-ammonium, most preferably from sodium, potassium, ammonium and mixtures thereof with magnesium ions. The preferred alkyl ethoxy carboxylates are those where R is a $C_{12}$ to $C_{18}$ alkyl group.

Alkyl polyethoxy polycarboxylate surfactants suitable for use herein include those having the formula RO—($CHR_1$—$CHR_2$—O)—$R_3$ wherein R is a $C_6$ to $C_{18}$ alkyl group, x is from 1 to 25, $R_1$ and $R_2$ are selected from the group consisting of hydrogen, methyl acid radical, succinic acid radical, hydroxysuccinic acid radical, and mixtures thereof, wherein at least one $R_1$ or $R_2$ is a succinic acid radical or hydroxysuccinic acid radical, and $R_3$ is selected from the group consisting of hydrogen, substituted or unsubstituted hydrocarbon having between 1 and 8 carbon atoms, and mixtures thereof.

Anionic secondary soap surfactant

Preferred soap surfactants are secondary soap surfactants which contain a carboxyl unit connected to a secondary carbon. The secondary carbon can be in a ring structure, e.g. as in p-octyl benzoic acid, or as in alkyl-substituted cyclohexyl carboxylates. The secondary soap surfactants should preferably contain no ether linkages, no ester linkages and no hydroxyl groups. There should preferably be no nitrogen atoms in the head-group (amphiphilic portion). The secondary soap surfactants usually contain 11–15 total carbon atoms, although slightly more (e.g., up to 16) can be tolerated, e.g. p-octyl benzoic acid.

The following general structures further illustrate some of the preferred secondary soap surfactants:

A. A highly preferred class of secondary soaps comprises the secondary carboxyl materials of the formula $R^3\ CH(R^4)$ COOM, wherein $R^3$ is $CH_3(CH_2)x$ and $R^4$ is $CH_3(CH_2)y$, wherein y can be O or an integer from 1 to 4, x is an integer from 4 to 10 and the sum of (x+y) is 6–10, preferably 7–9, most preferably 8.

B. Another preferred class of secondary soaps comprises those carboxyl compounds wherein the carboxyl substituent is on a ring hydrocarbyl unit, i.e., secondary soaps of the formula $R^5$—$R^6$—COOM, wherein $R^5$ is $C^7$–$C^{10}$, preferably $C^8$–$C^9$, alkyl or alkenyl and $R^6$ is a ring structure, such as benzene, cyclopentane and cyclohexane. (Note: $R^5$ can be in the ortho, meta or para position relative to the carboxyl on the ring.)

C. Still another preferred class of secondary soaps comprises secondary carboxyl compounds of the formula $CH_3(CHR)_k$—$(CH_2)_m$—$(CHR)_n$—CH(COOM)$(CHR)_o$—$(CH_2)_p$—$(CHR)_q$—$CH_3$, wherein each R is $C_1$–$C_4$ alkyl, wherein k, n, o, q are integers in the range of 0–8, provided that the total number of carbon atoms (including the carboxylate) is in the range of 10 to 18.

In each of the above formulas A, B and C, the species M can be any suitable, especially water-solubilizing, counterion.

Especially preferred secondary soap surfactants for use herein are water-soluble members selected from the group consisting of the water-soluble salts of 2-methyl-1-undecanoic acid, 2-ethyl-1-decanoic acid, 2-propyl- 1 -nonanoic acid, 2-butyl- 1 -octanoic acid and 2-pentyl-1-heptanoic acid.

Alkali metal sarcosinate surfactant

Other suitable anionic surfactants are the alkali metal sarcosinates of formula R-CON ($R^1$) $CH_2$ COOM, wherein R is a $C_5$–$C_{17}$ linear or branched alkyl or alkenyl group, $R^1$ is a $C_1$–$C_4$ alkyl group and M is an alkali metal ion. Preferred examples are the myristyl and oleyl methyl sarcosinates in the form of their sodium salts.

Nonionic surfactant

Essentially any anionic surfactants useful for detersive purposes can be included in the compositions. Exemplary, non-limiting classes of useful nonionic surfactants are listed below.

Nonionic polyhydroxy fatty acid amide surfactant

Polyhydroxy fatty acid amides suitable for use herein are those having the structural formula $R^2CONR^1Z$ wherein: R1 is H, $C_1$–$C_4$ hydrocarbyl, 2-hydroxy ethyl, 2-hydroxy propyl, or a mixture thereof, preferable C1–C4 alkyl, more preferably $C_1$ or $C_2$ alkyl, most preferably $C_1$ alkyl (i.e., methyl); and $R_2$ is a $C_5$–$C_{31}$ hydrocarbyl, preferably straight-chain $C_5$–$C_{19}$ alkyl or alkenyl, more preferably straight-chain $C_9$–$C_{17}$ alkyl or alkenyl, most preferably straight-chain $C_{11}$–$C_{17}$ alkyl or alkenyl, or mixture thereof; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z preferably will be derived from a reducing sugar in a reductive amination reaction; more preferably Z is a glycityl.

Nonionic condensates of alkyl phenols

The polyethylene polypropylene, and polybutylene oxide condensates of alkyl phenols are suitable for use herein. In general, the polyethylene oxide condensates are preferred. These compounds include the condensation products of alkyl phenols having an alkyl group containing from about 6 to about 18 carbon atoms in either a straight chain or branched chain configuration with the alkylene oxide.

Nonionic ethoxylated alcohol surfactant

The alkyl ethoxylate condensation products of aliphatic alcohols with from about 1 to about 25 moles of ethylene oxide are suitable for use herein. The alkyl chain of the aliphatic alcohol can either be straight or branched, primary or secondary, and generally contains from 6 to 22 carbon atoms. Particularly preferred are the condensation products of alcohols having an alkyl group containing from 8 to 20 carbon atoms with from about 2 to about 10 moles of ethylene oxide per mole of alcohol.

Nonionic ethoxylated/propoxylated fatty alcohol surfactant

The ethoxylated $C_6$–$C_{18}$ fatty alcohols and $C_6$–$C_{18}$ mixed ethoxylated/propoxylated fatty alcohols are suitable surfactants for use herein, particularly where water soluble. Preferably the ethoxylated fatty alcohols are the $C_{10}$–$C_{18}$ ethoxylated fatty alcohols with a degree of ethoxylation of from 3 to 50, most preferably these are the $C_{12}$–$C_{18}$ ethoxylated fatty alcohols with a degree of ethoxylation from 3 to 40. Preferably the mixed ethoxylated/propoxylated fatty alcohols have an alkyl chain length of from 10 to 18 carbon atoms, a degree of ethoxylation of from 3 to 30 and a degree of propoxylation of from 1 to 10.

Nonionic EO/PO condensates with propylene glycol

The condensation products of ethylene oxide with a hydrophobic base formed by the condensation of propylene oxide with propylene glycol are suitable for use herein. The hydrophobic portion of these compounds preferably has a molecular weight of from about 1500 to about 1800 and exhibits water insolubility. Examples of compounds of this type include certain of the commercially-available Pluronic™ surfactants, marketed by BASF.

Nonionic EO condensation products with propylene oxide/ethylene diamine adducts

The condensation products of ethylene oxide with the product resulting from the reaction of propylene oxide and ethylenediamine are suitable for use herein. The hydrophobic moiety of these products consists of the reaction product of ethylenediamine and excess propylene oxide, and generally has a molecular weight of from about 2500 to about 3000. Examples of this type of nonionic surfactant include certain of the commercially available Tetronic™ compounds, marketed by BASF.

Nonionic alkylpolysaccharide surfactant

Suitable alkylpolysaccharides for use herein are disclosed in U.S. Pat. No. 4,565,647, Llenado, issued Jan. 21, 1986, having a hydrophobic group containing from about 6 to about 30 carbon atoms, preferably from about 10 to about 16 carbon atoms and a polysaccharide, e.g., a polyglycoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6- positions on the preceding saccharide units.

The preferred alkylpolyglycosides have the formula $$R^2O(C_nH_{2n}O)t(glycosyl)_x$$

wherein R2 is selected from the group consisting of alkyl, alkylphenyl, hydroxyalkyl, hydroxyalkylphenyl, and mixtures thereof in which the alkyl groups contain from 10 to 18, preferably from 12 to 14, carbon atoms; n is 2 or 3; t is from 0 to 10, preferably 0, and X is from 1.3 to 8, preferably from 1.3 to 3, most preferably from 1.3 to 2.7. The glycosyl is preferably derived from glucose.

Nonionic fatty acid amide surfactant

Fatty acid amide surfactants suitable for use herein are those having the formula: $R^6CON(R^7)_2$ wherein $R^6$ is an alkyl group containing from 7 to 21, preferably from 9 to 17 carbon atoms and each $R^7$ is selected from the group consisting of hydrogen, $C_1$–$C_4$ alkyl, $C_1$–$C_4$ hydroxyalkyl, and $-(C_2H_4O)_xH$, where x is in the range of from 1 to 3.

Amphoteric surfactant

Suitable amphoteric surfactants for use herein include the amine oxide surfactants and the alkyl amphocarboxylic acids.

A suitable example of an alkyl aphodicarboxylic acid for use herein is Miranol(™) C2M Conc. manufactured by Miranol, Inc., Dayton, N.J.

Amine Oxide surfactant

Amine oxides useful herein include those compounds having the formula $$R^3(OR^4)_x\overset{\overset{O}{\uparrow}}{N}(R^5)_2$$

wherein $R^3$ is selected from an alkyl, hydroxyalkyl, acylamidopropoyl and alkyl phenyl group, or mixtures thereof, containing from 8 to 26 carbon atoms, preferably 8 to 18 carbon atoms; $R^4$ is an alkylene or hydroxyalkylene group containing from 2 to 3 carbon atoms, preferably 2 carbon atoms, or mixtures thereof; x is from 0 to 5, preferably from 0 to 3; and each $R^5$ is an alkyl or hydyroxyalkyl group containing from 1 to 3, preferably from 1 to 2 carbon atoms, or a polyethylene oxide group containing from 1 to 3, preferable 1, ethylene oxide groups. The $R^5$ groups can be attached to each other, e.g., through an oxygen or nitrogen atom, to form a ring structure.

These amine oxide surfactants in particular include $C_{10}$–$C_{18}$ alkyl dimethyl amine oxides and $C_8$–$C_{18}$ alkoxy ethyl dihydroxyethyl amine oxides. Examples of such materials include dimethyloctylamine oxide, diethyldecylamine oxide, bis-(2-hydroxyethyl)dodecylamine oxide, dimethyldodecylamine oxide, dipropyltetradecylamine oxide, methylethylhexadecylamine oxide, dodecylamidopropyl dimethylamine oxide, cetyl dimethylamine oxide, stearyl dimethylamine oxide, tallow dimethylamine oxide and dimethyl-2-hydroxyoctadecylamine oxide. Preferred are $C_{10}$–$C_{18}$ alkyl dimethylamine oxide, and $C_{10}$–$C_{18}$ acylamido alkyl dimethylamine oxide.

Zwitterionic surfactant

Zwitterionic surfactants can also be incorporated into the detergent compositions hereof. These surfactants can be broadly described as derivatives of secondary and tertiary amines, derivatives of heterocyclic secondary and tertiary amines, or derivatives of quaternary ammonium, quaternary phosphonium or tertiary sulfonium compounds. Betaine and sultaine surfactants are exemplary zwitterionic surfactants for use herein.

Betaine surfactant

The betaines useful herein are those compounds having the formula $R(R')_2N^+R^2COO$— wherein R is a $C_6$–$C_{18}$ hydrocarbyl group, preferably a $C_{10}$–$C_{16}$ alkyl group or $C_{10-16}$ acylamido alkyl group, each $R^1$ is typically $C_1$–$C_3$ alkyl, preferably methyl,m and $R^2$ is a $C_1$–$C_5$ hydrocarbyl group, preferably a $C_1$–$C_3$ alkylene group, more preferably a $C_1$–$C_2$ alkylene group. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4[$C_{14-16}$ acylmethylamidodiethylammonio]-1 -carboxybutane; $C_{16-18}$ acylamidodimethylbetaine; $C_{12-16}$ acylamidopentanediethyl-betaine; [$C_{12-16}$ acylmethylamidodimethylbetaine. Preferred betaines are $C_{12-18}$ dimethylammonio hexanoate and the $C_{10-18}$ acylamidopropane (or ethane) dimethyl (or diethyl) betaines. Complex betaine surfactants are also suitable for use herein.

Sultaine surfactant

The sultaines useful herein are those compounds having the formula $(R(R^1)_2N^+R^2SO_3$— wherein R is a $C_6$–$C_{18}$ hydrocarbyl group, preferably a $C_{10}$ –$C_{16}$ alkyl group, more preferably a $C_{12}$–$C_{13}$ alkyl group, each $R^1$ is typically $C_{1-C3}$ alkyl, preferably methyl, and $R^2$ is a $C_1$–$C_6$ hydrocarbyl group, preferably a $C_1$–$C_3$ alkylene or, preferably, hydroxyalkylene group.

Ampholytic surfactant

Ampholytic surfactants can be incorporated into the detergent compositions herein. These surfactants can be broadly described as aliphatic derivatives of secondary or tertiary amines, or aliphatic derivatives of heterocyclic secondary and tertiary amines in which the aliphatic radical can be straight chain or branched.

Cationic surfactants

Cationic surfactants can also be used in the detergent compositions herein. Suitable cationic surfactants include the quaternary ammonium surfactants selected from mono $C_6$–$C_{16}$, preferably $C_6$–$C_{10}$ N-alkyl or alkenyl ammonium surfactants wherein the remaining N positions are substituted by methyl, hydroxyethyl or hydroxypropyl groups.

Bleach

The detergent compositions of the invention contain as an essential component an organic peroxyacid bleach source. The peroxyacid bleach source may be the organic peroxyacid per se, or it may be a peroxyacid bleach precursor compound.

Where the source is a peroxyacid bleach precursor compound, the production of the peroxyacid occurs by an in situ reaction of the precursor with a source of hydrogen peroxide. Suitable sources of hydrogen peroxide include inorganic perhydrate bleaches.

Peroxyacid bleach precursors

Peroxyacid bleach precursors (bleach activators) are preferred peroxyacid sources in accord with the invention. Peroxyacid bleach precursors are normally incorporated at a level of from 1% to 20% by weight, more preferably from 2% to 10% by weight, most preferably from 3% to 5% by weight of the compositions.

Suitable peroxyacid bleach precursors typically contain one or more N- or O- acyl groups, which precursors can be selected from a wide range of classes. Suitable classes include anhydrides, esters, imides and acylated derivatives of imidazoles and oximes, and examples of useful materials within these classes are disclosed in GB-A-1586789.

Suitable esters are disclosed in GB-A-836988, 864798, 1147871, 2143231 and EP-A-0170386. The acylation products of sorbitol, glucose and all saccharides with benzoylating agents and acetylating agents are also suitable.

Specific O-acylated precursor compounds include 2,3,3-tri-methyl hexanoyl oxybenzene sulfonates, benzoyl oxybenzene sulfonates, nonanoyl-6-amino caproyl oxybenzene sulfonates, monobenzoyltetraacetyl glucose benzoyl peroxide and cationic derivatives of any of the above, including the alkyl ammonium derivatives and pentaacetyl glucose. Phthalic anhydride is a suitable anhydride type precursor.

Specific cationic derivatives of the O-acyl precursor compounds include 2-(N,N,N-trimethyl ammonium) ethyl sodium 4-sulphophenyl carbonate chloride, and any of the alkyl ammonium derivatives of the benzoyl oxybenzene sulfonates including the 4-(trimethyl ammonium) methyl derivative.

Useful N-acyl compounds are disclosed in GB-A-855735, 907356 and GB-A-1246338.

Preferred precursor compounds of the imide type include N-benzoyl succinimide, tetrabenzoyl ethylene diamine, N-benzoyl substituted ureas and the N-,N,$N^1N^1$ tetra acetylated alkylene diamines wherein the alkylene group contains from 1 to 6 carbon atoms, particularly those compounds in which the alkylene group contains 1, 2 and 6 carbon atoms. Tetraacetyl ethylene diamine (TAED) is particularly preferred.

N-acylated precursor compounds of the lactam class are disclosed generally in GB-A-955735. Whilst the broadest aspect of the invention contemplates the use of any lactam useful as a peroxyacid precursor, preferred materials comprise the caprolactams and valerolactams.

Suitable N-acylated lactam precursors have the formula:

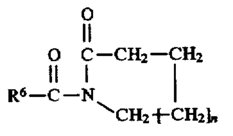

wherein n is from 0 to about 8, preferably from 0 to 2, and $R^6$ is H, an alkyl, aryl, alkoxyaryl or alkaryl group containing from 1 to 12 carbons, or a substituted phenyl group containing from 6 to 18 carbon atoms Suitable caprolactam bleach precursors are of the formula:

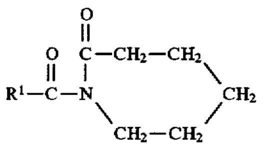

wherein $R^1$ is H or an alkyl, aryl, alkoxyaryl or alkaryl group containing from 1 to 12 carbon atoms, preferably from 6 to 12 carbon atoms, most preferably $R_1$ is phenyl.

Suitable valero lactams have the formula:

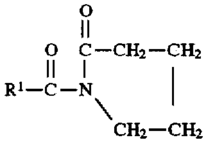

wherein $R^1$ is H or an alkyl, aryl, alkoxyaryl or alkaryl group containing from 1 to 12 carbon atoms, preferably from 6 to 12 carbon atoms. In highly preferred embodiments, $R^1$ is selected from phenyl, heptyl, octyl, nonyl, 2,4,4-trimethylpentyl, decenyl and mixtures thereof.

The most preferred materials are those which are normally solid at <30° C., particularly the phenyl derivatives, ie. benzoyl valerolactam, benzoyl caprolactam and their substituted benzoyl analogues such as chloro, amino alkyl, alkyl, aryl and alkoxy derivatives.

Caprolactam and valerolactam precursor materials wherein the $R^1$ moiety contains at least 6, preferably from 6 to 12, carbon atoms provide peroxyacids on perhydrolysis of a hydrophobic character which afford nucleophilic and body soil clean-up. Precursor compounds wherein $R^1$ comprises from 1 to 6 carbon atoms provide hydrophilic bleaching species which are particularly efficient for bleaching beverage stains. Mixtures of 'hydrophobic' and 'hydrophilic' caprolactams and valero lactams, typically at weight ratios of 1:5 to 5:1, preferably 1:1, can be used herein for mixed stain removal benefits.

Highly preferred caprolactam and valerolactam precursors include benzoyl caprolactam, nonanoyl capro-lactam, benzoyl valerolactam, nonanoyl valerolactam, 3,5,5-trimethylhexanoyl caprolactam, 3,5,5-trimethylhexanoyl valerolactam, octanoyl caprolactam, octanoyl valerolactam, decanoyl caprolactam, decanoyl valerolactam, undecenoyl caprolactam, undecenoyl valerolactam, (6-octanamidocaproyl)oxybenzene-sulfonate, (6-nonanamidocaproyl)oxybenzenesulfonate, (6-decanamidocaproyl)-oxybenzenesulfonate, and mixtures thereof. Examples of highly preferred substituted benzoyl lactams include methylbenzoyl caprolactam, methylbenzoyl valerolactam, ethylbenzoyl caprolactam, ethylbenzoyl valerolactam, propylbenzoyl caprolactam, propylbenzoyl valerolactam, isopropylbenzoyl caprolactam isopropylbenzoyl valerolactam, butylbenzoyl caprolactam, butylbenzoyl valerolactam, tert-butylbenzoyl caprolactam, tert-butylbenzoyl valerolactam, pentylbenzoyl caprolactam, pentylbenzoyl valerolactam, hexylbenzoyl caprolactam, hexylbenzoyl valerolactam, ethoxybenzoyl caprolactam, ethoxybenzoyl valerolactam, propoxybenzoyl caprolactam, propoxybenzoyl valerolactam, isopropoxybenzoyl caprolactam, isopropoxybenzoyl valerolactam, butoxybenzoyl caprolactam, butoxybenzoyl valerolactam, tert-butoxybenzoyl caprolactam, tert-butoxybenzoyl valerolactam, pentoxybenzoyl caprolactam, pentoxybenzoyl valerolactam, hexoxybenzoyl caprolactam, hexoxybenzoyl valerolactam, 2,4,6-trichlorobenzoyl caprolactam, 2,4,6-trichlorobenzoyl valerolactam, pentafluorobenzoyl caprolactam, pentafluorobenzoyl valerolactam, dichlorobenzoyl caprolactam, dimethoxybenzoyl caprolactam, 4-chlorobenzoyl caprolactam, 2,4-dichlororbenzoyl caprolactam, terephthaloyl dicaprolactam, pentafluorobenzoyl caprolactam, pentafluorobenzoyl valerolactam, dichlorobenzoyl valerolactam, dimethoxybenzoyl valerolactam, 4-chlorobenzoyl valerolactam, 2,4-dichlororbenzoyl valerolactam, terephthaloyl divalerolactam, 4-nitrobenzoyl caprolactam, 4-nitrobenzoyl valerolactam, and mixtures thereof.

Suitable imidazoles include N-benzoyl imidazole and N-benzoyl benzimidazole and other useful N-acyl group-containing peroxyacid precursors include N-benzoyl pyrrolidone, dibenzoyl taurine and benzoyl pyroglutamic acid.

Another preferred class of peroxyacid bleach activator compounds are the amide substituted compounds of the following general formulae:

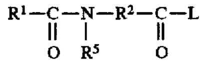

or

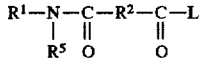

wherein $R^1$ is an aryl or alkaryl group with from 1 to 14 carbon atoms, $R^2$ is an alkylene, arylene, and alkrylene group containing from 1 to 14 carbon atoms, and $R^5$ is H or an alkyl, aryl, or alkaryl group containing 1 to 10 carbon atoms and L can be essentially any leaving group. $R^1$ preferably contains from 6 to 12 carbon atoms. $R^2$ preferably contains from 4 to 8 carbon atoms. $R^1$ may be straight chain or branched alkyl, substituted aryl or alkylaryl containing branching, substitution, or both and may be sourced from either synthetic sources or natural sources including for example, tallow fat. Analogous structural variations are permissible for $R^2$. The substitution can include alkyl, aryl, halogen, nitrogen, sulphur and other typical substituent groups or organic compounds. $R^5$ is preferably H or methyl. $R_1$ and $R^5$ should not contain more than 18 carbon atoms in total. Amide substituted bleach activator compounds of this type are described in EP-A-0170386.

The L group must be sufficiently reactive for the reaction to occur within the optimum time frame (e.g., a wash cycle). However, if L is too reactive, this activator will be difficult to stabilize for use in a bleaching composition. These characteristics are generally paralleled by the pKa of the conjugate acid of the leaving group, although exceptions to this convention are known. Ordinarily, leaving groups that exhibit such behavior are those in which their conjugate acid has a pKa in the range of from 4 to 13, preferably from 6 to 11 and most preferably from 8 to 11.

Preferred bleach precursors are those wherein $R^1$, $R^2$ and $R^5$ are as defined for the amide substituted compounds and L is selected from the group consisting of:

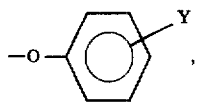

,

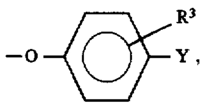

, and

-continued

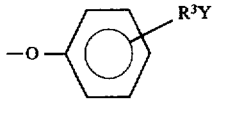 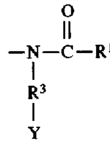,

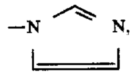, 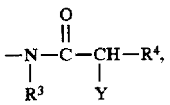,

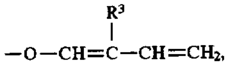, 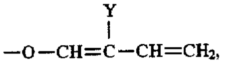,

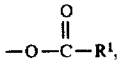, 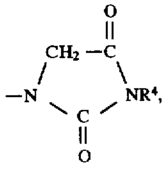, 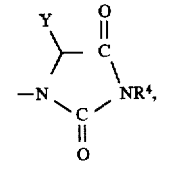,

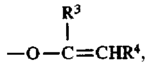, and 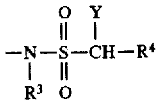

and mixtures thereof, wherein $R^1$ is an alkyl, aryl, or alkaryl group containing from 1 to 14 carbon atoms, $R^3$ is an alkyl chain containing from 1 to 8 carbon atoms, $R^4$ is H or $R^3$, and Y is H or a solubilizing group.

The preferred solubilizing groups are $-SO_3^-M^+$, $-CO_2^-M^+$, $-SO_4^-M^+$, $-N^+(R^3)_4X^-$ and $O\leftarrow N(R^3)_3$ and most preferably $-SO_3^-M^+$ and $-CO_2^-M^+$ wherein $R^3$ is an alkyl chain containing from 1 to 4 carbon atoms, M is a cation which provides solubility to the bleach activator and X is an anion which provides solubility to the bleach activator. Preferably, M is an alkali metal, ammonium or substituted ammonium cation, with sodium and potassium being most preferred, and X is a halide, hydroxide, methylsulfate or acetate anion. It should be noted that bleach activators with a leaving group that does not contain a solubilizing groups should be well dispersed in the bleaching solution in order to assist in their dissolution.

Preferred examples of bleach activators of the above formulae include (6-octanamidocaproyl) oxybenzenesulfonate, (6-nonanamidocaproyl) oxybenzenesulfonate, (6-decanamidocaproyl) oxybenzenesulfonate, and mixtures thereof.

Other preferred precursor compounds include those of the benzoxazin-type, having the formula:

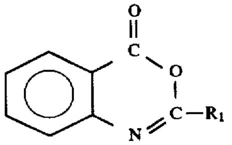

including the substituted benzoxazins of the type

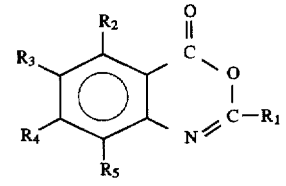

wherein $R_1$ is H, alkyl, alkaryl, aryl, arylalkyl, and wherein $R_2$, $R_3$, $R_4$, and $R_5$ may be the same or different substituents selected from H, halogen, alkyl, alkenyl, aryl, hydroxyl, alkoxyl, amino, alkyl amino, $COOR_6$ (wherein $R_6$ is H or an alkyl group) and carbonyl functions.

An especially preferred precursor of the benzoxazin-type is:

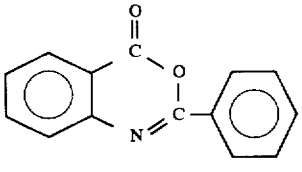

Organic peroxyacids

The detergent compositions may also contain organic peroxyacids typically at a level of from 1% to 15% by weight, more preferably from 1% to 10% by weight of the composition.

A preferred class of organic peroxyacid compounds are the amide substituted compounds of the following general formulae:

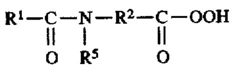 or 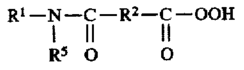

wherein $R_1$ is an aryl or alkaryl group with from 1 to 14 carbon atoms, $R^2$ is an alkylene, arylene, and alkarylene group containing from 1 to 14 carbon atoms, and $R^5$ is H or an alkyl, aryl, or alkaryl group containing 1 to 10 carbon atoms. $R^1$ preferably contains from 6 to 12 carbon atoms. $R^2$ preferably contains from 4 to 8 carbon atoms. $R^1$ may be straight chain or branched alkyl, substituted aryl or alkylaryl containing branching, substitution, or both and may be sourced from either synthetic sources or natural sources including for example, tallow fat. Analogous structural variations are permissible for $R^2$. The substitution can include alkyl, aryl, halogen, nitrogen, sulphur and other typical substituent groups or organic compounds. $R^5$ is preferably H or methyl. $R^1$ and $R^5$ should not contain more than 18 carbon atoms in total. Amide substituted organic peroxyacid compounds of this type are described in EP-A-0170386.

Other organic peroxyacids include diperoxy dodecanedioc acid, diperoxy tetra decanedioc acid, diperoxyhexadecanedioc acid, mono- and diperazelaic acid, mono- and diperbrassylic acid, monoperoxy phthalic acid, perbenzoic acid, and their salts as disclosed in, for example, EP-A-0341 947.

Inorganic perhydrate bleaches

The compositions in accord with the invention preferably include, as a hydrogen peroxide source, an inorganic perhydrate salt, most especially when the organic peroxyacid source is a peroxyacid bleach precursor compound.

The inorganic perhydrate salts are normally incorporated in the form of the sodium salt at a level of from 1% to 40% by weight, more preferably from 2% to 30% by weight and most preferably from 5% to 25% by weight of the compositions.

Examples of inorganic perhydrate salts include perborate, percarbonate, perphosphate, persulfate and persilicate salts. The inorganic perhydrate salts are normally the alkali metal salts. The inorganic perhydrate salt may be included as the crystalline solid without additional protection. For certain perhydrate salts however, the preferred executions of such granular compositions utilize a coated form of the material which provides better storage stability for the perhydrate salt in the granular product.

Sodium perborate can be in the form of the monohydrate of nominal formula $NaBO_2H_2O_2$ or the tetrahydrate $NaBOH_2H_2O_2O$.

Sodium percarbonate, which is a preferred perhydrate for inclusion in detergent compositions in accordance with the invention, is an addition compound having a formula corresponding to $2Na_2CO_3.3H_2O_2$, and is available commercially as a crystalline solid. The percarbonate is most preferably incorporated into such compositions in a coated form which provides in product stability.

A suitable coating material providing in product stability comprises mixed salt of a water soluble a metal sulphate and carbonate. This coating however allows for rapid release of the percarbonate bleach to the wash solution and is therefore not a suitable means for providing delayed release of the percarbonate bleach into a wash solution. Such coatings together with coating processes have previously been described in GB-466,799, granted to Interox on 9th Mar. 1977. The weight ratio of the mixed salt coating material to percarbonate lies in the range from 1:200 to 1:4, more preferably from 1:99 to 1:9, and most preferably from 1:49 to 1:19. Preferably, the mixed salt is of sodium sulphate and sodium carbonate which has the general formula $Na_2SO_4.n.Na_2CO_3$ wherein n is form 0.1 to 3, preferably n is from 0. 3 to 1. 0 and most preferably n is from 0. 2 to 0. 5.

Potassium peroxymonopersulfate is another inorganic perhydrate salt of use in the detergent compositions herein.

Bleach catalyst

The invention also encompasses compositions containing a catalytically effective amount of a bleach catalyst such as a water-soluble manganese salt.

The bleach catalyst is used in a catalytically effective amount in the compositions and processes herein. By "catalytically effective amount" is meant an amount which is sufficient, under whatever comparative test conditions are employed, to enhance bleaching and removal of the stain or stains of interest from the target substrate. Thus, in a fabric laundering operation, the target substrate will typically be a fabric stained with, for example, various food stains. For automatic dishwashing, the target substrate may be, for example, a porcelain cup or plate with tea stain or a polyethylene plate stained with tomato soup. The test conditions will vary, depending on the type of washing appliance used and the habits of the user. Thus, front-loading laundry washing machines of the type employed in Europe generally use less water and higher detergent concentrations than do top-loading U.S.-style machines. Some machines have considerably longer wash cycles than others. Some users elect to use very hot water: others use warm or even cold water in fabric laundering operations. Of course, the catalytic performance of the bleach catalyst will be affected by such considerations, and the levels of bleach catalyst used in fully-formulated detergent and bleach compositions can be appropriately adjusted. As a practical matter, and not by way of limitation, the compositions and processes herein can be adjusted to provide on the order of at least one part per ten million of the active bleach catalyst species in the aqueous washing liquor, and will preferably provide from about 1 ppm to about 200 ppm of the catalyst species in the laundry liquor. To illustrate this point further, on the order of 3 micromolar manganese catalyst is effective at 40° C., pH 10 under European conditions using perborate and a bleach precursor (e.g., benzoyl caprolactam). An increase in concentration of 3–5 fold may be required under U.S. conditions to achieve the same results. Conversely, use of a bleach precusor and the manganese catalyst with perborate may allow the formulator to achieve equivalent bleaching at lower perborate usage levels than products without the manganese catalyst.

The bleach catalyst material herein can comprise the free acid or be in the form of any suitable salts.

One type of bleach catalyst is a catalyst system comprising a heavy metal cation of defined bleach catalytic activity, such as copper, iron or manganese cations, an auxiliary metal cation having little or no bleach catalytic activity, such as zinc or aluminum cations, and a sequestrant having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

Other types of bleach catalysts include the manganese-based complexes disclosed in U.S. Pat. No. 5,246,621 and U.S. Pat. No. 5,244,594. Preferred examples of these catalysts include $Mn^{IV}_2(u\text{-}O)_3$(1,4,7-trimethyl- 1,4,7-triazacyclononane)$_2$-$(PF_6)_2$, $Mn^{III}_2(u\text{-}O)_1$ $(u\text{-}OAc)_2$(1,4,7-trimethyl- 1,4,7-triazacyclononane)$_2$-$(ClO_4)_2$, $Mn^{IV}_4(u\text{-}O)_6$ (1,4,7-triazacyclononane)$_4$-$(ClO_4)_2$, $Mn^{III}Mn^{IV}_4(u\text{-}O)_1$ $(u\text{-}OAc)_2$-( 1,4,7-trimethyl-1,4,7-triazacyclononane)$_2$-$(ClO_4)_3$, and mixtures thereof. Others are described in European patent application publication no. 549,272. Other ligands suitable for use herein include 1,5,9-trimethyl-1,5,9-triazacyclododecane, 2-methyl-1,4,7-triazacyclononane, 2-methyl- 1,4,7-triazacyclononane, 1,2,4,7-tetramethyl-1,4,7-triazacyclononane, and mixtures thereof.

The bleach catalysts useful in the compositions herein may also be selected as appropriate for the present invention. For examples of suitable bleach catalysts see U.S. Pat. No. 4,246,612 and U.S. Pat. No. 5,227,084.

See also U.S. Pat. No. 5,194,416 which teaches mononuclear manganese (IV) complexes such as Mn(1,4,7-trimethyl-1,4,7-triazacyclononane)$(OCH_3)_3$-$(PF_6)$.

Still another type of bleach catalyst, as disclosed in U.S. Pat. No. 5,114,606, is a water-soluble complex of manganese (II), (III), and/or (IV) with a ligand which is a non-carboxylate polyhydroxy compound having at least three consecutive C—OH groups. Preferred ligands include sorbitol, iditol, dulsitol, mannitol, xylithol, arabitol, adonitol, meso-erythritol, meso-inositol, lactose, and mixtures thereof.

U.S. Pat. No. 5,114,611 teaches a bleach catalyst comprising a complex of transition metals, including Mn, Co, Fe, or Cu, with an non-(macro)-cyclic ligand. Said ligands are of the formula:

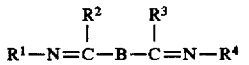

wherein $R^1$, $R^2$, $R^3$, and $R^4$ can each be selected from H, substituted alkyl and aryl groups such that each $R^1$—N=C—$R^2$ and $R^3$—C=N—$R^4$ form a five or sixmembered ring. Said ring can further be substituted. B is a bridging group selected from O,S. $CR^5R^6$, $NR^7$ and C=O, wherein $R^5$, $R^6$, and $R^7$ can each be H, alkyl, or aryl groups, including substituted groups. Preferred ligands include pyridine, pyridazine, pyrimidine, pyrazine, imidazole, pyrazole, and triazole rings. Optionally, said rings may be substituted with substituents such as alkyl, aryl, alkoxy, halide, and nitro. Particularly preferred is the ligand 2,2'-bispyridylamine. Preferred bleach catalysts include Co, Cu, Mn, Fe,-bispyridylmethane and -bispyridylamine complexes. Highly preferred catalysts include Co(2,2'-bispyridylamine)$Cl_2$, Di(isothiocyanato)bispyridylamine-cobalt (II), trisdipyridylamine-cobalt(II) perchlorate, Co(2,2-bispyridylamine)$_2O_2ClO_4$, Bis-(2,2'-bispyridylamine) copper(II) perchlorate, tris(di-2-pyridylamine) iron(II) perchlorate, and mixtures thereof.

Other examples include Mn gluconate, $Mn(CF_3SO_3)_2$, $Co(NH_3)_5Cl$, and the binuclear Mn complexed with tetra-N-dentate and bi-N-dentate ligands, including $N_4Mn^{III}$(u-O)$_2$ $Mn^{IV}N_4)^+$ and $[Bipy_2Mn^{III}(u\text{-}O)_2Mn^{IV}bipy_2]\text{-}(ClO_4)_3$.

The bleach catalysts of the present invention may also be prepared by combining a water-soluble ligand with a water-soluble manganese salt in aqueous media and concentrating the resulting mixture by evaporation. Any convenient water-soluble salt of manganese can be used herein. Manganese (II), (III), (IV) and/or (V) is readily available on a commercial scale. In some instances, sufficient manganese may be present in the wash liquor, but, in general, it is preferred to add Mn cations in the compositions to ensure its presence in catalytically-effective amounts. Thus, the sodium salt of the ligand and a member selected from the group consisting of $MnSO_4$, $Mn(ClO_4)_2$ or $MnCl_2$ (least preferred) are dissolved in water at molar ratios of ligand:Mn salt in the range of about 1:4 to 4:1 at neutral or slightly alkaline pH. The water may first be de-oxygenated by boiling and cooled by sparging with nitrogen. The resulting solution is evaporated (under $N_2$, if desired) and the resulting solids are used in the bleaching and detergent compositions herein without further purification.

In an alternate mode, the water-soluble manganese source, such as $MnSO_4$, is added to the bleach/cleaning composition or to the aqueous bleaching/cleaning bath which comprises the ligand. Some type of complex is apparently formed in situ, and improved bleach performance is secured. In such an in situ process, it is convenient to use a considerable molar excess of the ligand over the manganese, and mole ratios of ligand:Mn typically are 3:1 to 15:1. The additional ligand also serves to scavenge vagrant metal ions such as iron and copper, thereby protecting the bleach from decomposition. One possible such system is described in European patent application, publication no. 549,271.

While the structures of the bleach-catalyzing manganese complexes of the present invention have not been elucidated, it may be speculated that they comprise chelates or other hydrated coordination complexes which result from the interaction of the carboxyl and nitrogen atoms of the ligand with the manganese cation. Likewise, the oxidation state of the manganese cation during the catalytic process is not known with certainty, and may be the (+II), (+III), (+IV) or (+V) valence state. Due to the ligands' possible six points of attachment to the manganese cation, it may be reasonably speculated that multi-nuclear species and/or "cage" structures may exist in the aqueous bleaching media. Whatever the form of the active Mn:ligand species which actually exists, it functions in an apparently catalytic manner to provide improved bleaching performances on stubborn stains such as tea, ketchup, coffee, blood, and the like.

Other bleach catalysts are described, for example, in European patent application, publication no. 408,131 (cobalt complex catalysts), European patent applications, publication nos. 384,503, and 306,089 (metallo-porphyrin catalysts), U.S. Pat. No. 4,728,455 (manganese/multidentate ligand catalyst), U.S. Pat. No. 4,711,748 and European patent application, publication no. 224,952, (absorbed manganese on aluminosilicate catalyst), U.S. Pat. No. 4,601,845 (aluminosilicate support with manganese and zinc or magnesium salt), U.S. Pat. No. 4,626,373 (manganese/ligand catalyst), U.S. Pat. No. 4,119,557 (ferric complex catalyst), German Pat. specification 2,054,019 (cobalt chelant catalyst) Canadian 866,191 (transition metal-containing salts), U.S. Pat. No. 4,430,243 (chelants with manganese cations and non-catalytic metal cations), and U.S. Pat. No. 4,728,455 (manganese gluconate catalysts).

Relative release kinetics

In an essential aspect of the invention a means is provided for delaying the release to a wash solution of the peroxyacid bleach relative to the release of the surfactant.

Said means may comprise a means for delaying the release of the peroxyacid bleach to the wash solution.

Alternatively said means may comprise a means for enhancing the rate of release of the surfactant to the solution.

Delayed rate of release—means

The means may provide for delayed release of the peroxyacid bleach source itself to the wash solution. Alternatively, where the peroxyacid source is a peroxyacid precursor compound the delayed release means may comprise a means of inhibiting, or preventing the in situ perhydrolysis reaction which releases the peroxyacid into the solution. Such means could, for example, include delaying release of the hydrogen peroxide source to the wash solution, by for example, delaying release of any inorganic perhydrate salt, acting as a hydrogen peroxide source, to the wash solution.

The delayed release means can include coating any suitable component with a coating designed to provide the delayed release. The coating may therefore, for example, comprise a poorly water soluble material, or be a coating of sufficient thickness that the kinetics of dissolution of the thick coating provide the controlled rate of release.

The coating material may be applied using various methods. Any coating material is typically present at a weight ratio of coating material to bleach of from 1:99 to 1:2, preferably from 1:49 to 1:9.

Suitable coating materials include triglycerides (e.g. partially) hydrogenated vegetable oil, soy bean oil, cotton seed oil) mono or diglycerides, microcrystalline waxes, gelatin, cellulose, fatty acids and any mixtures thereof.

Other suitable coating materials can comprise the alkali and alkaline earth metal sulphates, silicates and carbonates, including calcium carbonate.

Preferred coating material is sodium silicate of $SiO_2$:$Na_2O$ ratio from 1.6:1 to 3.4:1, preferably 2.8:1, applied as an aqueous solution to give a level of from 2% to 10%, (normally from 3% to 5%) of silicate solids by weight of the percarbonate. Magnesium silicate can also be included in the coating.

Any inorganic salt coating materials may be combined with organic binder materials to provide composite inorganic salt/organic binder coatings. Suitable binders include the $C_{10}$–$C_{20}$ alcohol ethoxylates containing from 5–100 moles of ethylene oxide per mole of alcohol and more preferably the $C_{15}$–$C_{20}$ primary alcohol ethoxylates containing from 20–100 moles of ethylene oxide per mole of alcohol.

Other preferred binders include certain polymeric materials. Polyvinylpyrrolidones with an average molecular weight of from 12,000 to 700,000 and polyethylene glycols (PEG) with an average molecular weight of from 600 to 10,000 are examples of such polymeric materials. Copolymers of maleic anhydride with ethylene, methylvinyl ether or methacrylic acid, the maleic anhydride constituting at least 20 mole percent of the polymer are further examples of polymeric materials useful as binder agents. These polymeric materials may be used as such or in combination with solvents such as water, propylene glycol and the above mentioned $C_{10}$–$C_{20}$ alcohol ethoxylates containing from 5–100 moles of ethylene oxide per mole. Further examples of binders include the $C_{10}$–$C_{20}$ mono- and diglycerol ethers and also the $C_{10}$–$C_{20}$ fatty acids.

Cellulose derivatives such as methylcellulose, carboxymethylcellulose and hydroxyethylcellulose, and homo- or co-polymeric polycarboxylic acids or their salts are other examples of binders suitable for use herein.

One method for applying the coating material involves agglomeration. Preferred agglomeration processes include the use of any of the organic binder materials described hereinabove. Any conventional agglomerator/mixer may be used including, but not limited to pan, rotary drum and vertical blender types. Molten coating compositions may also be applied either by being poured onto, or spray atomized onto a moving bed of bleaching agent.

Other means of providing the required delayed release include mechanical means for altering the physical characteristics of the bleach to control its solubility and rate of release. Suitable protocols could include compaction, mechanical injection, manual injection, and adjustment of the solubility of the bleach compound by selection of particle size of any particulate component.

Whilst the choice of particle size will depend both on the composition of the particulate component, and the desire to meet the desired delayed release kinetics, it is desirable that the particle size should be more than 500 micrometers, preferably having an average particle diameter of from 800 to 1200 micrometers.

Additional protocols for providing the means of delayed release include the suitable choice of any other components of the detergent composition matrix such that when the composition is introduced to the wash solution the ionic strength environment therein provided enables the required delayed release kinetics to be achieved.

Enhanced rate of release—means

All suitable means for enhancing the rate of release of the surfactant to the solution are envisaged.

The enhanced release means can include coating any suitable component with a coating designed to provide the enhanced release. The coating may therefore, for example, comprise a highly, or even effervescently, water soluble material.

Other means of providing the required delayed release include mechanical means for altering the physical characteristics of the surfactant to enhance its solubility and rate of release.

A suitable protocol could include deliberate selection of the particle size of any surfactant containing component. The choice of particle size will depend both on the composition of the particulate component, and the desire to meet the desired enhanced release kinetics. It is desirable that the particle size should be less than 1200 micrometers, preferably having an average particle diameter of from 1100 to 500 micrometers.

Additional protocols for providing the means of delayed release include the suitable choice of any other components of the detergent composition matrix, or of any particulate component containing the surfactant, such that when the composition is introduced to the wash solution the ionic strength environment therein provided enables the required enhanced release kinetics to be achieved.

Delayed release—kinetic parameters

The release of the peroxyacid bleach component from the peroxyacid bleach source relative to that of the surfactant component is such that in the T50 test method herein described the time to achieve a concentration that is 50% of the ultimate concentration of said surfactant is less than 120 seconds, preferably less than 90 seconds, more preferably less than 60 seconds, and the time to achieve a concentration that is 50% of the ultimate concentration of said peroxyacid bleach is more than 180 seconds, preferably from 180 to 480 seconds, more preferably from 240 to 360 seconds.

In a highly preferred aspect of the invention the release of bleach is such that in the T50 test method herein described the time to achieve a level of total available oxygen (AVO) that is 50% of the ultimate level is more than 180 seconds, preferably from 180 to 480 seconds, more preferably from 240 to 360 seconds. A method for determining AVO levels is disclosed in European Patent Application No. 93870004.4.

In another preferred aspect of the invention, where the peroxyacid bleach source is a peroxyacid bleach precursor, employed in combination with a hydrogen peroxide source the kinetics of release to the wash solution of the hydrogen peroxide relative to those of the surfactant component is such that in the T50 test method herein described the time to achieve a concentration that is 50% of the ultimate concentration of said surfactant is less than 120 seconds, preferably less than 90 seconds, more preferably less than 60 seconds, and the time to achieve a concentration that is 50% of the ultimate concentration of said hydrogen peroxide is more that 180 seconds, preferably from 180 to 480 seconds, more preferably 240 to 360 seconds.

The ultimate wash concentration of the surfactant is typically from 0.005% to 0.4%, preferably from 0.05% to 0.35%, more preferably from 0.1% to 0.3%.

The ultimate wash concentration of any inorganic perhydrate bleach is typically from 0.005% to 0.25% by weight, but preferably is more than 0.05%, more preferably more than 0.075%.

The ultimate wash concentration of any peroxyacid precursor is typically 0.001% to 0.08% by weight, but preferably is from 0.005% to 0.05%, most preferably from 0.015% to 0.05%.

Delayed release—test method

The delayed release kinetics herein are defined with respect to a 'TA test method' which measures the time to achieve A% of the ultimate concentration/level of that component when a composition containing the component is dissolved according to the standard conditions now set out.

The standard conditions involve a 1 liter glass beaker filled with 1000 ml of distilled water at 20° C., to which 10 g of composition is added. The contents of the beaker are agitated using a magnetic stirrer set at 100 rpm. The ultimate concentration/level is taken to be the concentration/level attained 10 minutes after addition of the composition to the water-filled beaker.

Suitable analytical methods are chosen to enable a reliable determination of the incidental, and ultimate in solution concentrations of the component of concern, subsequent to the addition of the composition to the water in the beaker.

Such analytical methods can include those involving a continuous monitoring of the level of concentration of the component, including for example photometric and conductrimetric methods.

Alternatively, methods involving removing titers from the solution at set time intervals, stopping the dissolution process by an appropriate means such as by rapidly reducing the temperature of the titer, and then determining the concentration of the component in the titer by any means such as chemical titrimetric methods, can be employed.

Suitable graphical methods, including curve fitting methods, can be employed, where appropriate, to enable calculation of the TA value from raw analytical results.

The particular analytical method selected for determining the concentration of the component, will depend on the nature of that component, and of the nature of the composition containing that component.

Additional detergent components

The detergent compositions of the invention may also contain additional detergent components. The precise nature of these additional components, and levels of incorporation thereof will depend on the physical form of the composition, and the nature of the cleaning operation for which it is to be used.

The compositions of the invention may for example, be formulated as hand and machine laundry detergent compositions, including laundry additive compositions and compositions suitable for use in the pretreatment of stained fabrics and machine dishwashing compositions.

When formulated as compositions suitable for use in a machine washing method, eg: machine laundry and machine dishwashing methods, the compositions of the invention preferably contain one or more additional detergent components selected from builders, heavy metal ion sequestrants, organic polymeric compounds, additional enzymes, suds suppressors, lime soap dispersants, soil suspension and anti-redeposition agents and corrosion inhibitors. Laundry compositions can also contain, as additional detergent components, softening agents.

Water-soluble builder compound

The detergent compositions of the present invention contain as a preferred optional component a water-soluble builder compound, typically present at a level of from 1% to 80% by weight, preferably from 10% to 70% by weight, most preferably from 20% to 60% by weight of the composition.

Suitable water-soluble builder compounds include the water soluble monomeric polycarboxylates, or their acid forms, homo or copolymeric polycarboxylic acids or their salts in which the polycarboxylic acid comprises at least two carboxylic radicals separated from each other by not more that two carbon atoms, carbonates, bicarbonates, borates, phosphates, silicates and mixtures of any of the foregoing.

The carboxylate or polycarboxylate builder can be momomeric or oligomeric in type although monomeric polycarboxylates are generally preferred for reasons of cost and performance.

Suitable carboxylates containing one carboxy group include the water soluble salts of lactic acid, glycolic acid and ether derivatives thereof. Polycarboxylates containing two carboxy groups include the water-soluble salts of succinic acid, malonic acid, (ethylenedioxy) diacetic acid, maleic acid, diglycolic acid, tartaric acid, tartronic acid and fumaric acid, as well as the ether carboxylates and the sulfinyl carboxylates. Polycarboxylates containing three carboxy groups include, in particular, water-soluble citrates, aconitrates and citraconates as well as succinate derivatives such as the carboxymethyloxysuccinates described in British Patent No. 1,379,241, lactoxysuccinates described in British Patent No. 1,389,732, and aminosuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in British Patent Nos. 1,398,421 and 1,398,422 and in U.S. Pat. No. 3,936,448, and the sulfonated pyrolysed citrates described in British Patent No. 1,439,000.

Alicyclic and heterocyclic polycarboxylates include cyclopentane-cis,cis,cis-tetracarboxylates, cyclopentadienide pentacarboxylates, 2,3,4,5-tetrahydrofuran-cis, cis, cis-tetracarboxylates, 2,5-tetrahydrofuran-cis-dicarboxylates, 2,2,5,5-tetrahydrofuran-tetracarboxylates, 1,2,3,4,5,6-hexane-hexacarboxylates and carboxymethyl derivatives of polyhydric alcohols such as sorbitol, mannitol and xylitol. Aromatic polycarboxylates include mellitic acid, pyromellitic acid and the phthalic acid derivatives disclosed in British Patent No. 1,425,343.

Of the above, the preferred polycarboxylates are hydroxycarboxylates containing up to three carboxy groups per molecule, more particularly citrates.

The parent acids of the monomeric or oligomeric polycarboxylate chelating agents or mixtures thereof with their salts, e.g. citric acid or citrate/citric acid mixtures are also contemplated as useful builder components.

Borate builders, as well as builders containing borate-forming materials that can produce borate under detergent storage or wash conditions can also be used but are not preferred at wash conditions less that about 50° C., especially less than about 40° C.

Examples of carbonate builders are the alkaline earth and alkali metal carbonates, including sodium carbonate and sesqui-carbonate and mixtures thereof with ultra-fine calcium carbonate as disclosed in German Patent Application No. 2,321,001 published on Nov. 15, 1973.

Specific examples of water-soluble phosphate builders are the alkali metal tripolyphosphates, sodium, potassium and ammonium pyrophosphate, sodium and potassium and ammonium pyrophosphate, sodium and potassium orthophosphate, sodium polymeta/phosphate in which the degree of polymerization ranges from about 6 to 21, and salts of phytic acid.

Suitable silicates include the water-soluble sodium silicates with an $SiO_2$: $Na_2O$ ratio of from 1.0 to 2.8, with ratios of from 1.6 to 2.4 being preferred, and 2.0 ratio being most preferred. The silicates may be in the form of either the anhydrous salt or a hydrated salt. Sodium silicate with an $SiO_2$: $Na_2O$ ratio of 2.0 is the most preferred silicate.

Silicates are preferably present in the detergent compositions in accord with the invention at a level of from 5% to 50% by weight of the composition, more preferably from 10% to 40% by weight.

Partially soluble or insoluble builder compound

The detergent compositions of the present invention may contain a partially soluble or insoluble builder compound, typically present at a level of from 1% to 80% by weight, preferably from 10% to 70% by weight, most preferably from 20% to 60% weight of the composition.

Examples of partially water soluble builders include the crystalline layered silicates. Examples of largely water insoluble builders include the sodium aluminosilicates.

Crystalline layered sodium silicates have the general formula $NaMSi_xO_{2x+1}.yH_2O$ where in M is sodium or hydrogen, x is a number from 1.9 to 4 and y is a number from 0 to 20. Crystalline layered sodium silicates of this type are disclosed in EP-A-0164514 and methods for their preparation are disclosed in DE-A-3417649 and DE-A-3742043. For the purpose of the present invention, x in the general formula above has a value of 2, 3 or 4 and is preferably 2. The most preferred material is $\delta$-$Na_2Si_2O_5$, available from Hoechst AG as NaSKS-6.

The crystalline layered sodium silicate material is preferably present in granular detergent compositions as a particulate in intimate admixture with a solid, water-soluble ionisable material. The solid, water-soluble ionisable material is selected from organic acids, organic and inorganic acid salts and mixtures thereof.

Suitable aluminosilicate zeolites have the unit cell formula $Na_z[(AlO_2)_z(SiO_2)y]$ $XH_2O$ wherein z and y are at least 6; the molar ratio of z to y is from 1.0 to 0.5 and x is at least 5, preferably from 7.5 to 276, more preferably from 10 to 264. The aluminosilicate material are in hydrated form and are preferably crystalline, containing from 10% to 28%, more preferably from 18% to 22% water in bound form.

The aluminosilicate ion exchange materials can be naturally occurring materials, but are preferably synthetically derived. Synthetic crystalline aluminosilicate ion exchange materials are available under the designations Zeolite A, Zeolite B, Zeolite P, Zeolite X, Zeolite MAP, Zeolite HS and mixtures thereof. Zeolite A has the formula $Na_{12}[AlO_2)_{12}(SiO_2)_{12}].xH_2O$ wherein x is from 20 to 30, especially 27. Zeolite X has the formula $Na_{86}$ $[(AlO_2)_{86}(SiO_2)_{106}]$. 276 $H_2O$.

Heavy metal ion sequestrant

The detergent compositions of the invention may contain as a preferred optional component a heavy metal ion sequestrant. By heavy metal ion sequestrant it is meant herein components which act to sequester (chelate) heavy metal ions. These components may also have calcium and magnesium chelation capacity, but preferentially they show selectivity to binding heavy metal ions such as iron, manganese and copper.

Heavy metal ion sequestrants are preferably present at a level of from 0.005% to 20%, more preferably from 0. 1% to 10%, most preferably from 0.5% to 5% by weight of the compositions.

Heavy metal ion sequestrants, which are acidic in nature, having for example phosphonic acid or carboxylic acid functionalities, may be present either in their acid form or as a complex/salt with a suitable counter cation such as an alkali or alkaline metal ion, ammonium, or substituted ammonium ion, or any mixtures thereof. Preferably any salts/complexes are water soluble. The molar ratio of said counter cation to the heavy metal ion sequestrant is preferably at least 1:1.

Suitable heavy metal ion sequestrants for use herein include organic phosphonates, such as the amino alkylene poly (alkylene phosphonates), alkali metal ethane 1-hydroxy disphosphonates and nitrilo trimethylene phosphonates.

Preferred among the above species are diethylene triamine penta (methylene phosphonate), ethylene diamine tri (methylene phosphonate), hexamethylene diamine tetra (methylene phosphonate) and hydroxy-ethylene 1,1 diphosphonate.

Other suitable heavy metal ion sequestrant for use herein include nitrilotriacetic acid and polyaminocarboxylic acids such as ethylenediaminotetracetic acid, ethylenetriamine pentacetic acid, ethylenediamine disuccinic acid, ethylenediamine diglutaric acid, 2-hydroxypropylenediamine disuccinic acid or any salts thereof.

Especially preferred is ethylenediamine-N,N'-disuccinic acid (EDDS) or the alkali metal, alkaline earth metal, ammonium, or substituted ammonium salts thereof, or mixtures thereof. Preferred EDDS compounds are the free acid form and the sodium or magnesium salt or complex thereof. Examples of such preferred sodium salts of EDDS include $Na_2$EDDS and $Na_3$EDDS. Examples of such preferred magnesium complexes of EDDS include MgEDDS and $Mg_2$EDDS.

Other suitable heavy metal ion sequestrants for use herein are iminodiacetic acid derivatives such as 2-hydroxyethyl diacetic acid or glyceryl imino diacetic acid, described in EP-A-317,542 and EP-A-399,133.

The iminodiacetic acid-N-2-hydroxypropyl sulfonic acid and aspartic acid N-carboxymethyl N-2-hydroxypropyl-3-sulfonic acid sequestrants described in EP-A-516,102 are also suitable herein. The $\beta$-alanine-N,N'-diacetic acid, aspartic acid-N,N'-diacetic acid, aspartic acid-N-monoacetic acid and iminodisuccinic acid sequestrants described in EP-A-509,382 are also suitable.

EP-A-476,257 describes suitable amino based sequestrants. EP-A-510,331 describes suitable sequestrants derived from collagen, keratin or casein. EP-A-528,859 describes a suitable alkyl iminodiacetic acid sequestrant. Dipicolinic acid and 2-phosphonobutane-1,2,4-tricarboxylic acid are also suitable. Glycinamide-N,N'-disuccinic acid (GADS) is also suitable.

Enzyme

Another optional ingredient useful in the detergent compositions is one or more additional enzymes.

Preferred additional enzymatic materials include the commercially available lipases, amylases, neutral and alkaline proteases, esterases, cellulases, pectinases, lactases and peroxidases conventionally incorporated into detergent compositions. Suitable enzymes are discussed in U.S. Pat. Nos. 3,519,570 and 3,533,139.

Preferred commercially available protease enzymes include those sold under the tradenames Alcalase, Savinase, Primase, Durazym, and Esperase by Novo Industries A/S (Denmark), those sold under the tradename Maxatase, Maxacal and Maxapem by Gist-Brocades, those sold by Genencor International, and those sold under the tradename Opticlean and Optimase by Solvay Enzymes. Protease enzyme may be incorporated into the compositions in accordance with the invention at a level of from 0.0001% to 4% active enzyme by weight of the composition.

Preferred amylases include, for example, $\alpha$-amylases obtained from a special strain of *B licheniformis*, described in more detail in GB-1,269,839 (Novo). Preferred commercially available amylases include for example, those sold under the tradename Rapidase by Gist-Brocades, and those sold under the tradename Termamyl and BAN by Novo Industries A/S. Amylase enzyme may be incorporated into the composition in accordance with the invention at a level of from 0.0001% to 2% active enzyme by weight of the composition.

Lipolytic enzyme (lipase) may be present at levels of active lipolytic enzyme of from 0.0001% to 2% by weight, preferably 0.001% to 1% by weight, most preferably from 0.001% to 0.5% by weight of the compositions.

The lipase may be fungal or bacterial in origin being obtained, for example, from a lipase producing strain of Humicola sp., Thermomyces sp. or Pseudomonas sp. including *Pseudomonas pseudoalcaligenes* or *Pseudomas fluore-*

*scens*. Lipase from chemically or genetically modified mutants of these strains are also useful herein.

A preferred lipase is derived from *Pseudomonas pseudoalcaligenes*, which is described in Granted European Patent, EP-B-0218272.

Another preferred lipase herein is obtained by cloning the gene from *Humicola lanuginosa* and expressing the gene in *Aspergillus oryza*, as host, as described in European Patent Application, EP-A-0258 068, which is commercially available from Novo Industri A/S, Bagsvaerd, Denmark, under the trade name Lipolase. This lipase is also described in U.S. Pat. No. 4,810,414, Huge-Jensen et al, issued Mar. 7, 1989.

Enzyme Stabilizing System

Preferred enzyme-containing compositions herein may comprise from about 0.001% to about 10%, preferably from about 0.005% to about 8%, most preferably from about 0.01% to about 6%, by weight of an enzyme stabilizing system. The enzyme stabilizing system can be any stabilizing system which is compatible with the detersive enzyme. Such stabilizing systems can comprise calcium ion, boric acid, propylene glycol, short chain carboxylic acid, boronic acid, and mixtures thereof. Such stabilizing systems can also comprise reversible enzyme inhibitors, such as reversible protease inhibitors.

The compositions herein may further comprise from 0 to about 10%, preferably from about 0.101% to about 6% by weight, of chlorine bleach scavengers, added to prevent chlorine bleach species present in many water supplies from attacking and inactivating the enzymes, especially under alkaline conditions. While chlorine levels in water may be small, typically in the range from about 0.5 ppm to about 1.75 ppm, the available chlorine in the total volume of water that comes in contact with the enzyme during washing is usually large; accordingly, enzyme stability in-use can be problematic.

Suitable chlorine scavenger anions are widely available, and are illustrated by salts containing ammonium cations or sulfite, bisulfite, thiosulfite, thiosulfate, iodide, etc. Antioxidants such as carbamate, ascorbate, etc., organic amines such as ethylenediaminetetracetic acid (EDTA) or alkali metal salt thereof, monoethanolamine (MEA), and mixtures thereof can likewise be used. Other conventional scavengers such as bisulfate, nitrate, chloride, sources of hydrogen peroxide such as sodium perborate tetrahydrate, sodium perborate monohydrate and sodium percarbonate, as well as phosphate, condensed phosphate, acetate, benzoate, citrate, formate, lactate, malate, tartrate, salicylate, etc. and mixtures thereof can be used if desired.

Organic polymeric compound

Organic polymeric compounds are particularly preferred components of the detergent compositions in accord with the invention. By organic polymeric compound it is meant essentially any polymeric organic compound commonly used as dispersants, and anti-redeposition and soil suspension agents in detergent compositions.

Organic polymeric compound is typically incorporated in the detergent compositions of the invention at a level of from 0.1% to 30%, preferably from 0.5% to 15%, most preferably from 1 % to 10% by weight of the compositions.

Examples of organic polymeric compounds include the water soluble organic homo- or co-polymeric polycarboxylic acids or their salts in which the polycarboxylic acid comprises at least two carboxyl radicals separated from each other by not more than two carbon atoms. Polymers of the latter type are disclosed in GB-A-1,596,756. Examples of such salts are polyacrylates of MWt 2000–5000 and their copolymers with maleic anhydride, such copolymers having a molecular weight of from 20,000 to 100,000, especially 40,000 to 80,000.

Other suitable organic polymeric compounds include the polymers of acrylamide and acrylate having a molecular weight of from 3,000 to 100,000, and the acrylate/fumarate copolymers having a molecular weight of from 2,000 to 80,000.

The polyamino compounds are useful herein including those derived from aspartic acid such as those disclosed in EP-A-305282, EP-A-305283 and EP-A-351629.

Other organic polymeric compounds suitable for incorporation in the detergent compositions herein include cellulose derivatives such as methylcellulose, carboxymethylcellulose and hydroxyethylcellulose.

Further useful organic polymeric compounds are the polyethylene glycols, particularly those of molecular weight 1000–10000, more particularly 2000 to 8000 and most preferably about 4000.

Lime soap dispersant compound

The compositions of the invention may contain a lime soap dispersant compound, which has a lime soap dispersing power (LSDP), as defined hereinafter of no more than 8, preferably no more than 7, most preferably no more than 6. The lime soap dispersant compound is preferably present at a level of from 0.1% to 40% by weight, more preferably 1% to 20% by weight, most preferably from 2% to 10% by weight of the compositions.

A lime soap dispersant is a material that prevents the precipitation of alkali metal, ammonium or amine salts of fatty acids by calcium or magnesium ions. A numerical measure of the effectiveness of a lime soap dispersant is given by the lime soap dispersing power (LSDP) which is determined using the lime soap dispersion test as described in an article by H. C. Borghetty and C. A. Bergman, J. Am. Oil. Chem. Soc., volume 27, pages 88–90, (1950). This lime soap dispersion test method is widely used by practitioners in this art field being referred to, for example, in the following review articles; W. N. Linfield, Surfactant Science Series, Volume 7, p3; W. N. Linfield, Tenside Surf. Det. Volume 27, pages 159–161, (1990); and M. K. Nagarajan, W. F. Masler, Cosmetics and Toiletries, Volume 104, pages 71–73, (1989). The LSDP is the % weight ratio of dispersing agent to sodium oleate required to disperse the lime soap deposits formed by 0.025g of sodium oleate in 30 ml of water of 333 ppm $CaCO_3$ (Ca:Mg=3:2) equivalent hardness.

Surfactants having good lime soap dispersant capability will include certain amine oxides, betaines, sulfobetaines, alkyl ethoxysulfates and ethoxylated alcohols.

Exemplary surfactants having a LSDP of no more than 8 for use in accord with the invention include $C_{16}$–$C_{18}$ dimethyl amine oxide, $C_{12}$–$C_{18}$ alkyl ethoxysulfates with an average degree of ethoxylation of from 1–5, particularly $C_{12}$–$C_{15}$ alkyl ethoxysulfate surfactant with a degree of ethoxylation of about 3 (LSDP=4), and the $C_{13}$–$C_{15}$ ethoxylated alcohols with an average degree of ethoxylation of either 12 (LSDP=6) or 30, sold under the trade names Lutensol A012 and Lutensol A030 respectively, by BASF GmbH.

Polymeric lime soap dispersants suitable for use herein are described in the article by M. K. Nagarajan and W. F. Masler, to be found in Cosmetics and Toiletries, Volume 104, pages 71–73, (1989). Examples of such polymeric lime soap dispersants include certain water-soluble salts of copolymers of acrylic acid, methacrylic acid or mixtures thereof, and an acrylamide or substituted acrylamide, where such polymers typically have a molecular weight of from 5,000 to 20,000.

Suds suppressing system

The detergent compositions of the invention, when formulated for use in machine washing compositions, preferably comprise a suds suppressing system present at a level of from 0.01% to 15%, preferably from 0.05% to 10%, most preferably from 0.1% to 5% by weight of the composition.

Suitable suds suppressing systems for use herein may comprise essentially any known antifoam compound, including, for example silicone antifoam compounds, 2-alkyl and alcanol antifoam compounds.

By antifoam compound it is meant herein any compound or mixtures of compounds which act such as to depress the foaming or sudsing produced by a solution of a detergent composition, particularly in the presence of agitation of that solution.

Particularly preferred antifoam compounds for use herein are silicone antifoam compounds defined herein as any antifoam compound including a silicone component. Such silicone antifoam compounds also typically contain a silica component. The term "silicone" as used herein, and in general throughout the industry, encompasses a variety of relatively high molecular weight polymers containing siloxane units and hydrocarbyl group of various types. Preferred silicone antifoam compounds are the siloxanes, particularly the polydimethylsiloxanes having trimethylsilyl end blocking units.

Other suitable antifoam compounds include the monocarboxylic fatty acids and soluble salts thereof. These materials are described in U.S. Pat. No. 2,954,347, issued Sep. 27, 1960 to Wayne St. John. The monocarboxylic fatty acids, and salts thereof, for use as suds suppressor typically have hydrocarbyl chains of 10 to about 24 carbon atoms, preferably 12 to 18 carbon atoms. Suitable salts include the alkali metal salts such as sodium, potassium, and lithium salts, and ammonium and alkanolammonium salts.

Other suitable antifoam compounds include, for example, high molecular weight fatty esters (e.g. fatty acid triglycerides), fatty acid esters of monovalent alcohols, aliphatic $C_{18}$–$C_{40}$ ketones (e.g. stearone) N-alkylated amino triazines such as tri- to hexa-alkylmelamines or di- to tetra alkyldiamine chlortriazines formed as products of cyanuric chloride with two or three moles of a primary or secondary amine containing 1 to 24 carbon atoms, propylene oxide, bis stearic acid amide and monostearyl di-alkali metal (e.g. sodium, potassium, lithium) phosphates and phosphate esters.

Copolymers of ethylene oxide and propylene oxide, particularly the mixed ethoxylated/propoxylated fatty alcohols with an alkyl chain length of from 10 to 16 carbon atoms, a degree of ethoxylation of from 3 to 30 and a degree of propoxylation of from 1 to 10, are also suitable antifoam compounds for use herein.

Suitable 2-alky-alcanols antifoam compounds for use herein have been described in DE 40 21 265. The 2-alkyl-alcanols suitable for use herein consist of a $C_6$ to $C_{16}$ alkyl chain carrying a terminal hydroxy group, and said alkyl chain is substituted in the a position by a $C_1$ to $C_{10}$ alkyl chain. Mixtures of 2-alkyl-alcanols can be used in the compositions according to the present invention.

A preferred suds suppressing system comprises (a) antifoam compound, preferably silicone antifoam compound, most preferably a silicone antifoam compound comprising in combination
  (i) polydimethyl siloxane, at a level of from 50% to 99%, preferably 75% to 95% by weight of the silicone antifoam compound; and
  (ii) silica, at a level of from 1% to 50%, preferably 5% to 25% by weight of the silicone/silica antifoam compound;

wherein said silica/silicone antifoam compound is incorporated at a level of from 5% to 50%, preferably 10% to 40% by weight;

(b) a dispersant compound, most preferably comprising a silicone glycol rake copolymer with a polyoxyalkylene content of 72–78% and an ethylene oxide to propylene oxide ratio of from 1:0.9 to 1:1.1, at a level of from 0.5% to 10%, preferably 1% to 10% by weight; a particularly preferred silicone glycol rake copolymer of this type is DC0544, commercially available from DOW Corning under the tradename DC0544;

(c) an inert carrier fluid compound, most preferably comprising a $C_{16}$–$C_{18}$ ethoxylated alcohol with a degree of ethoxylation of from 5 to 50, preferably 8 to 15, at a level of from 5% to 80%, preferably 10% to 70%, by weight;

A preferred particulate suds suppressor system useful herein comprises a mixture of an alkylated siloxane of the type hereinabove disclosed and solid silica.

The solid silica can be a fumed silica, a precipitated silica or a silica, made by the gel formation technique. The silica particles suitable have an average particle size of from 0.1 to 50 micrometers, preferably from 1 to 20 micrometers and a surface area of at least 50 $m^2/g$. These silica particles can be rendered hydrophobic by treating them with dialkylsilyl groups and/or trialkyisilyl groups either bonded directly onto the silica or by means of a silicone resin. It is preferred to employ a silica the particles of which have been rendered hydrophobic with dimethyl and/or trimethyl silyl groups. A preferred particulate antifoam compound for inclusion in the detergent compositions in accordance with the invention suitably contain an amount of silica such that the weight ratio of silica to silicone lies in the range from 1:100 to 3:10, preferably from 1:50 to 1:7.

Another suitable particulate suds suppressing system is represented by a hydrophobic silanated (most preferably trimethyl-silanated) silica having a particle size in the range from 10 nanometers to 20 nanometers and a specific surface area above 50$m^2/g$, intimately admixed with dimethyl silicone fluid having a molecular weight in the range from about 500 to about 200,000 at a weight ratio of silicone to silanated silica of from about 1:1 to about 1:2.

A highly preferred particulate suds suppressing system is described in EP-A-0210731 and comprises a silicone antifoam compound and an organic carrier material having a melting point in the range 50° C. to 85° C., wherein the organic carrier material comprises a monoester of glycerol and a fatty acid having a carbon chain containing from 12 to 20 carbon atoms. EP-A-0210721 discloses other preferred particulate suds suppressing systems wherein the organic carrier material is a fatty acid or alcohol having a carbon chain containing from 12 to 20 carbon atoms, or a mixture thereof, with a melting point of from 45° C. to 80° C.

Other highly preferred particulate suds suppressing systems are described in copending European Application 91870007.1 in the name of the Procter and Gamble Company which systems comprise silicone antifoam compound, a carrier material, an organic coating material and glycerol at a weight ratio of glycerol: silicone antifoam compound of 1:2 to 3:1. Copending European Application 91201342.0 also discloses highly preferred particulate suds suppressing systems comprising silicone antifoam compound, a carrier material, an organic coating material and crystalline or amorphous aluminosilicate at a weight ratio of aluminosilicate: silicone antifoam compound of 1:3 to 3:1. The preferred carrier material in both of the above described highly preferred granular suds controlling agents is starch.

An exemplary particulate suds suppressing system for use herein is a particulate agglomerate component, made by an agglomeration process, comprising in combination (i) from 5% to 30%, preferably from 8% to 15% by weight of the component of silicone antifoam compound, preferably comprising in combination polydimethyl siloxane and silica;

(ii) from 50% to 90%, preferably from 60% to 80% by weight of the component, of carrier material, preferably starch;

(iii) from 5% to 30%, preferably from 10% to 20% by weight of the component of agglomerate binder compound, where herein such compound can be any compound, or mixtures thereof typically employed as binders for agglomerates, most preferably said agglomerate binder compound comprises a $C_{16}$–$C_{18}$ ethoxylated alcohol with a degree of ethoxylation of from 50 to 100; and (iv) from 2% to 15%, preferably from 3% to 10%, by weight of $C_{12}$–$C_{22}$ hydrogenated fatty acid.

Polymeric dye transfer inhibiting agents

The detergent compositions herein may also comprise from 0.01% to 10%, preferably from 0.05% to 0.5% by weight of polymeric dye transfer inhibiting agents.

The polymeric dye transfer inhibiting agents are preferably selected from polyamine N-oxide polymers, copolymers of N-vinylpyrrolidone and N-vinylimidazole, polyvinylpyrrolidonepolymers or combinations thereof.

a) Polyamine N-oxide polymers

Polyamine N-oxide polymers suitable for use herein contain units having the following structure formula:

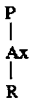

(I)

wherein P is a polymerisable unit, whereto the R—N—O group can be attached to, or wherein the R—N—O group forms part of the polymerisable unit or a combination of both.

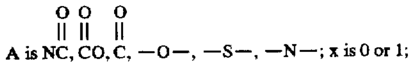

A is NC, CO, C, —O—, —S—, —N—; x is 0 or 1;

R are alphatic, ethoxylated aliphatics, aromatic, heterocyclic or alicyclic groups or any combination thereof whereto the nitrogen of the N—O group can be attached of wherein the nitrogen of the N—O group is part of these groups.

The N—O group can be represented by the following general structures:

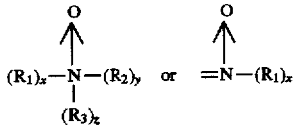

or wherein $R_1$, $R_2$, and $R_3$ are aliphatic groups, aromatic, heterocyclic or alicyclic groups or combinations thereof, x or/and y or/and z is 0 or 1 and wherein the nitrogen of the N—O group can be attached or wherein the nitrogen of the N—O group forms part of these groups. The N—O group can be part of the polymerisable unit (P) or can be attached to the polymeric backbone or a combination of both.

Suitable polyamine N-oxides wherein the N—O group forms part of the polymerisable unit comprise polyamine N-oxides wherein R is selected from aliphatic, aromatic, alicyclic or heterocyclic groups. One class of said polyamine N-oxides comprises the group of polyamine N-oxides wherein the nitrogen of the N—O group forms part of the R-group. Preferred polyamine N-oxides are those wherein R is a heterocyclic group such as pyrridine, pyrrole, imidazole, pyrrolidine, piperidine, quinoline, acridine and derivatives thereof.

Another class of said polyamine N-oxides comprises the group of polyamine N-oxides wherein the nitrogen of the N—O group is attached to the R-group.

Other suitable polyamine N-oxides are the polyamine oxides whereto the N—O group is attached to the polymerisable unit.

Preferred class of these polyamine N-oxides are the polyamine N-oxides having the general formula (I) wherein R is an aromatic, heterocyclic or alicyclic groups wherein the nitrogen of the N—O functional group is part of said R group. Examples of these classes are polyamine oxides wherein R is a heterocyclic compound such as pyrridine, pyrrole, imidazole and derivatives thereof.

Another preferred class of polyamine N-oxides are the polyamine oxides having the general formula (I) wherein R are aromatic, heterocyclic or alicyclic groups wherein the nitrogen of the N—O functional group is attached to said R groups. Examples of these classes are polyamine oxides wherein R groups can be aromatic such as phenyl.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof.

The amine N-oxide polymers of the present invention typically have a ratio of amine to the amine N-oxide of 10:1 to 1:1000000. However the amount of amine oxide groups present in the polyamine oxide polymer can be varied by appropriate copolymerization or by appropriate degree of N-oxidation. Preferably, the ratio of amine to amine N-oxide is from 2:3 to 1: 1000000. More preferably from 1:4 to 1:1000000, most preferably from 1:7 to 1:1000000. The polymers of the present invention actually encompass random or block copolymers where one monomer type is an amine N-oxide and the other monomer type is either an amine N-oxide or not. The amine oxide unit of the polyamine N-oxides has a PKa<10, preferably PKa<7, more preferred PKa<6.

The polyamine oxides can be obtained in almost any degree of polymerisation. The degree of polymerisation is not critical provided the material has the desired water-solubility and dye-suspending power. Typically, the average molecular weight is within the range of 500 to 1000,000; preferably from 1,000 to 50,000, more preferably from 2,000 to 30,000, most preferably from 3,000 to 20,000.

b) Copolymers of N-vinylpyrrolidone and N-vinylimidazole

Preferred polymers for use herein may comprise a polymer selected from N-vinylimidazole N-vinylpyrrolidone copolymers wherein said polymer has an average molecular weight range from 5,000 to 50,000 more preferably from 8,000 to 30,000, most preferably from 10,000 to 20,000. The preferred N-vinylimidazole N-vinylpyrrolidone copolymers have a molar ratio of N-vinylimidazole to N-vinylpyrrolidone from 1 to 0.2, more preferably from 0.8 to 0.3, most preferably from 0.6 to 0.4.

c) Polyvinylpyrrolidone

The detergent compositions herein may also utilize polyvinylpyrrolidone ("PVP") having an average molecular weight of from 2,500 to 400,000, preferably from 5,000 to 200,000, more preferably from 5,000 to 50,000, and most preferably from 5.000 to 15.000. Suitable polyvinylpyrrolidones are commercially vailable from ISP Corporation, New York, N.Y. and Montreal, Canada under the product names PVP K-15 (viscosity molecular weight of 10.000), PVP K-30 (average molecular weight of 40.000), PVP K-60 (average molecular weight of 160.000), and PVP K-90 (average molecular weight of 360.000). PVP K-15 is also available from ISP Corporation. Other suitable polyvinylpyrrolidones which are commercially available from BASF Cooperation include Sokalan HP 165 and Sokalan HP 12.

Polyvinylpyrrolidone may be incorporated in the detergent compositions herein at a level of from 0.01% to 5% by weight of the detergent, preferably from 0.05% to 3% by weight, and more preferably from 0.1% to 2% by weight. The amount of polyvinylpyrrolidone delivered in the wash solution is preferably from 0.5 ppm to 250 ppm, preferably from 2.5 ppm to 150 ppm, more preferably from 5 ppm to 100 ppm.

d) Polyvinyloxazolidone

The detergent compositions herein may also utilize polyvinyloxazolidones as polymeric dye transfer inhibiting agents. Said polyvinyloxazolidones have an average molecular weight of from 2.500 to 400.000, preferably from 5.000 to 200.000, more preferably from 5.000 to 50.000, and most preferably from 5.000 to 15.000.

The amount of polyvinyloxazolidone incorporated in the detergent compositions may be from 0.01% to 5% by weight, preferably from 0.05% to 3% by weight, and more preferably from 0.1% to 2% by weight. The amount of polyvinyloxazolidone delivered in the wash solution is typically from 0.5 ppm to 250 ppm, preferably from 2.5 ppm to 150 ppm, more preferably from 5 ppm to 100 ppm.

e) Polyvinylimidazole

The detergent compositions herein may also utilize polyvinylimidazole as polymeric dye transfer inhibiting agent. Said polyvinylimidazoles preferably have an average molecular weight of from 2.500 to 400.000, more preferably from 5.000 to 50.000, and most preferably from 5.000 to 15.000.

The amount of polyvinylimidazole incorporated in the detergent compositions may be from 0.01% to 5% by weight, preferably from 0.05% to 3% by weight, and more preferably from 0.1% to 2% by weight. The amount of polyvinylimidazole delivered in the wash solution is from 0.5 ppm to 250 ppm, preferably from 2.5 ppm to 150 ppm, more preferably from 5 ppm to 100 ppm.

Optical brightener

The detergent compositions herein may also optionally contain from about 0.005% to 5% by weight of certain types of hydrophilic optical brighteners which also provide a dye transfer inhibition action. If used, the compositions herein will preferably comprise from about 0.01% to 1% by weight of such optical brighteners.

The hydrophilic optical brighteners useful in the present invention are those having the structural formula:

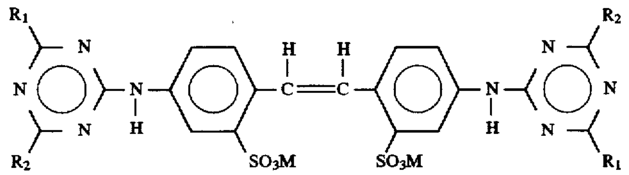

wherein $R_1$ is selected from anilino, N-$_2$-bis-hydroxyethyl and NH-2-hydroxyethyl; $R_2$ is selected from N-2-bis-hydroxyethyl, N-2-hydroxyethyl-N-methylamino, morphilino, chloro and amino; and M is a salt-forming cation such as sodium or potassium.

When in the above formula, $R_1$ is anilino, $R_2$ is N-2-bis-hydroxyethyl and M is a cation such as sodium, the brightener is 4,4',-bis[(4-anilino-6-(N-2-bis-hydroxyethyl)-s-triazine-2-yl)amino]-2,2'-stilbenedisulfonic acid and disodium salt. This particular brightener species is commercially marketed under the tradename Tinopal-UNPA-GX by Ciba-Geigy Corporation. Tinopal-UNPA-GX is the preferred hydrophilic optical brightener useful in the detergent compositions herein.

When in the above formula, $R_1$ is anilino, $R_2$ is N-2-hydroxyethyl-N-2-methylamino and M is a cation such as sodium, the brightener is 4,4'-bis[(4-anilino-6-(N-2 -hydroxyethyl-N-methylamino)-s-triazine-2-yl)amino]2,2'-stilbenedisulfonic acid disodium salt. This particular brightener species is commercially marketed under the tradename Tinopal 5BM-GX by Ciba-Geigy Corporation.

When in the above formula, $R_1$ is anilino, $R_2$ is morphilino and M is a cation such as sodium, the brightener is 4,4'-bis[(4-anilino-6-morphilino-s-triazine-2-yl)amino]2,2'-stilbenedisulfonic acid, sodium salt. This particular brightener species is commercially marketed under the tradename Tinopal AMS-GX by Ciba Geigy Corporation.

The specific optical brightener species selected for use in the present invention provide especially effective dye transfer inhibition performance benefits when used in combination with the selected polymeric dye transfer inhibiting agents hereinbefore described. The combination of such selected polymeric materials (e.g., PVNO and/or PVPVI) with such selected optical brighteners (e.g., Tinopal UNPA-GX, Tinopal 5BM-GX and/or Tinopal AMS-GX) provides significantly better dye transfer inhibition in aqueous wash solutions than does either of these two detergent composition components when used alone. Without being bound by theory, it is believed that such brighteners work this way because they have high affinity for fabrics in the wash solution and therefore deposit relatively quick on these fabrics. The extent to which brighteners deposit on fabrics in the wash solution can be defined by a parameter called the "exhaustion coefficient". The exhaustion coefficient is in general as the ratio of a) the brightener material deposited on fabric to b) the initial brightener concentration in the wash liquor. Brighteners with relatively high exhaustion coefficients are the most suitable for inhibiting dye transfer in the context of the present invention.

Of course, it will be appreciated that other, conventional optical brightener types of compounds can optionally be used in the present compositions to provide conventional fabric "brightness" benefits, rather than a true dye transfer inhibiting effect. Such usage is conventional and well-known to detergent formulations Softening agents Fabric softening agents can also be incorporated into laundry detergent compositions in accordance with the present invention. These agents may be inorganic or organic in type. Inorganic softening agents are exemplified by the smectite clays disclosed in GB-A-1 400 898. Organic fabric softening agents include the water insoluble tertiary amines as disclosed in GB-A-1 514 276 and EP-B-0 011 340.

Levels of smectite clay are normally in the range from 5% to 15%, more preferably from 8% to 12% by weight, with the material being added as a dry mixed component to the remainder of the formulation. Organic fabric softening agents such as the water-insoluble tertiary amines or dilong chain amide materials are incorporated at levels of from 0.5% to 5% by weight, normally from 1% to 3% by weight, whilst the high molecular weight polyethylene oxide materials and the water soluble cationic materials are added at levels of from 0.1% to 2%, normally from 0. 15% to 1.5% by weight.

Other optional ingredients

Other optional ingredients suitable for inclusion in the compositions of the invention include perfumes, colours and filler salts, with sodium sulfate being a preferred filler salt.

Form of the compositions

The detergent compositions of the invention can be formulated in any desirable form such as powders, granulates, pastes, liquids, tablets and gels.

Liquid compositions

The detergent compositions of the present invention may be formulated as liquid detergent compositions. Such liquid detergent compositions typically comprise from 94% to 35% by weight, preferably from 90% to 40% by weight, most preferably from 80% to 50% by weight of a liquid carrier e.g., water, preferably a mixture of water and organic solvent.

Gel compositions

The detergent compositions of the present invention may also be in the form of gels. Such compositions are typically formulated with polyalkenyl polyether having a molecular weight of from about 750,000 to about 4,000,000.

Solid compositions

The detergent compositions of the invention are preferably in the form of solids, such as powders and granules.

The particle size of the components of granular compositions in accordance with the invention should preferably be such that no more that 5% of particles are greater than 1.4 mm in diameter and not more than 5% of particles are less than 0.15 mm in diameter.

The bulk density of granular detergent compositions in accordance with the present invention typically have a bulk density of at least 450 g/liter, more usually at least 600 g/liter and more preferably from 650 g/liter to 1200 g/liter.

Bulk density is measured by means of a simple funnel and cup device consisting of a conical funnel moulded rigidly on a base and provided with a flap valve at its lower extremity to allow the contents of the funnel to be emptied into an axially aligned cylindrical cup disposed below the funnel. The funnel is 130 mm and 40 mm at its respective upper and lower extremities. It is mounted so that the lower extremity is 140 mm above the upper surface of the base. The cup has an overall height of 90 mm, an internal height of 87 mm and an internal diameter of 84 mm. Its nominal volume is 500 ml.

To carry out a measurement, the funnel is filled with powder by hand pouring, the flap valve is opened and powder allowed to overfill the cup. The filled cup is removed from the frame and excess powder removed from the cup by passing a straight edged implement e.g. a knife, across its upper edge. The filled cup is then weighed and the value obtained for the weight of powder doubled to provide the bulk density in g/liter. Replicate measurements are made as required.

Making processes—granular compositions

In general, granular detergent compositions in accordance with the present invention can be made via a variety of methods including dry mixing, spray drying, agglomeration and granulation.

Washing methods

The compositions of the invention may be used in essentially any washing or cleaning method, including machine laundry and dishwashing methods.

Machine dishwashing method

A preferred machine dishwashing method comprises treating soiled articles selected from crockery, glassware, hollowware and cutlery and mixtures thereof, with an aqueous liquid having dissolved or dispensed therein an effective amount of a machine dishwashing composition in accord with the invention. By an effective amount of the machine dishwashing composition it is meant from 8 g to 60 g of product dissolved or dispersed in a wash solution of volume from 3 to 10 liters, as are typical product dosages and wash solution volumes commonly employed in conventional machine dishwashing methods.

Machine laundry methods

Machine laundry methods herein comprise treating soiled laundry with an aqueous wash solution in a washing machine having dissolved or dispensed therein an effective amount of a machine laundry detergent composition in accord with the invention. The detergent can be added to the wash solution either via the dispenser drawer of the washing machine or by a dispensing device. By an effective amount of the detergent composition it is meant from 40g to 300g of product dissolved or dispersed in a wash solution of volume from 5 to 65 liters, as are typical product dosages and wash solution volumes commonly employed in conventional machine laundry methods.

In a preferred washing method herein a dispensing device containing an effective amount of detergent product is introduced into the drum of a front-loading washing machine before the commencement of the wash cycle.

The dispensing device is a container for the detergent product which is used to deliver the product directly into the drum of the washing machine. Its volume capacity should be such as to be able to contain sufficient detergent product as would normally be used in the washing method.

Once the washing machine has been loaded with laundry the dispensing device containing the detergent product is placed inside the drum. At the commencement of the wash cycle of the washing machine water is introduced into the drum and the drum periodically rotates. The design of the dispensing device should be such that it permits containment of the dry detergent product but then allows release of this product during the wash cycle in response to its agitation as the drum rotates and also as a result of its immersion in the wash water.

To allow for release of the detergent product during the wash the device may possess a number of openings through which the product may pass. Alternatively, the device may be made of a material which is permeable to liquid but impermeable to the solid product, which will allow release of dissolved product. Preferably, the detergent product will be rapidly released at the start of the wash cycle thereby providing transient localised high concentrations of product in the drum of the washing machine at this stage of the wash cycle.

Preferred dispensing devices are reusable and are designed in such a way that container integrity is maintained in both the dry state and during the wash cycle. Especially preferred dispensing devices for use in accord with the invention have been described in the following patents; GB-B-2,157,717, GB-B-2,157,718, EP-A-0201376, EP-A-0288345 and EP-A-0288346. An article by J. Bland published in Manufacturing Chemist, November 1989, pages 41–46 also describes especially preferred dispensing devices for use with granular laundry products which are of a type commonly know as the "granulette".

Especially preferred dispensing devices are disclosed in European Patent Application Publication Nos. 0343069 & 0343070. The latter Application discloses a device comprising a flexible sheath in the form of a bag extending from a support ring defining an orifice, the orifice being adapted to admit to the bag sufficient product for one washing cycle in a washing process. A portion of the washing medium flows through the orifice into the bag, dissolves the product, and the solution then passes outwardly through the orifice into the washing medium. The support ring is provided with a masking arrangement to prevent egress of wetted, undissolved, product, this arrangement typically comprising radially extending walls extending from a central boss in a spoked wheel configuration, or a similar structure in which the walls have a helical form.

Pretreatment washing method

In a pretreatment wash method aspect of the invention a soiled/stained substrate is treated with an effective amount of a pretreatment solution containing a surfactant, but no bleach components. The solution might optionally contain other non-bleach detergent components such as builders, heavy metal ion sequestrants enzymes and detergent polymers.

The level of the surfactant in said pretreatment solution is typically from 0.05% to 80%, and preferably is more than 1%.

The pretreatment solution is allowed to remain in contact with the soiled substrate for an effective time interval. Said time interval will typically be from 10 seconds to 1800 seconds, more preferably from 60 seconds to 600 seconds.

The soiled substrate is then washed using a suitable washing method wherein a bleach-containing detergent product is employed. The washing method may for example, be any of the machine dishwashing or machine laundry washing methods described herein.

In the detergent compositions, the abbreviated component identifications have the following meanings:

| | |
|---|---|
| XYAS: | Sodium $C_{1X}$–$C_{1Y}$ alkyl sulfate |
| 25EY: | A $C_{12-15}$ predominantly linear primary alcohol condensed with an average of Y moles of ethylene oxide |
| XYEZ: | A $C_{1x}$–$C_{1y}$ predominantly linear primary alcohol condensed with an average of Z moles of ethylene oxide |
| XYEZS: | $C_{1X}$–$C_{1Y}$ sodium alkyl sulfate condensed with an average of Z moles of ethylene oxide per mole |
| TFAA: | $C_{16}$–$C_{18}$ alkyl N-methyl glucamide. |
| Silicate: | Amorphous Sodium Silicate ($SiO_2$:$Na_2O$ ratio = 2.0) |
| NaSKS-6: | Crystalline layered silicate of formula δ-$Na_2Si_2O_5$ |
| Carbonate: | Anhydrous sodium carbonate |
| Polycarboxylate: | Copolymer of 1:4 maleic/acrylic acid, average molecular weight about 80,000 |
| Zeolite A: | Hydrated Sodium Aluminosilicate of formula $Na_{12}(AlO_2SiO_2)_{12}.27H_2O$ having a primary particle size in the range from 1 to 10 micrometers |
| Citrate: | Tri-sodium citrate dihydrate |
| Percarbonate (fast release particle): | Anhydrous sodium percarbonate bleach of empirical formula $2Na_2CO_3.3H_2O_2$ coated with a mixed salt of formula $Na_2SO_4.n.Na_2CO_3$ where n is 0.29 and where the weight ratio of percarbonate to mixed salt is 39:1 |
| Percarbonate (slow release particle): | Anhydrous sodium percarbonate bleach coated with a coating of sodium silicate ($Si_2O$:$Na_2O$ ratio = 2:1) at a weight ratio of percarbonate to sodium silicate of 39:1 |
| TAED: | Tetraacetyl ethylene diamine |
| TAED (slow release particle): | Particle formed by agglomerating TAED with citric acid and polyethylene glycol (PEG) of Mw = 4,000 with a weight ratio of components of TAED:citric acid:PEG of 75:10:15, coated with an external coating of citric acid at a weight ratio of agglomerate:citric acid coating of 95:5. |
| Benzoyl Caprolactam (slow release particle): | Particle formed by agglomerating benzoyl caprolactam (BzCl) with citric acid and polyethylene glycol (PEG) of Mw = 4,000, with a weight ratio of components of BzCl:citric acid:PEG of 63:21:16, coated with an external coating of citric acid at a weight ratio of agglomerate:citric acid coating of 95:5 |
| TAED (fast release particle): | Particle formed by agglomerating TAED with partially neutralised polycarboxylate at a ratio of TAED:polycarboxylate of 93:7, coated with an external coating of polycarboxylate at a weight ratio of agglomerate:coating of 96:4 |
| EDDS (fast release particle): | Particle formed by spray-drying EDDS with $MgSO_4$ at a weight ratio of 26:74 |
| Protease: | Proteolytic enzyme sold under the tradename Savinase by Novo Industries A/S with an activity of 13 KNPU/g. |
| Amylase: | Amylolytic enzyme sold under the tradename Termamyl 60T by Novo Industries A/S with an activity of 300 KNU/g |
| Cellulase: | Cellulosic enzyme sold by Novo Industries A/S with an activity of 2000 CEVU/g |
| Lipase: | Lipolytic enzyme sold under the tradename Lipolase by Novo Industries A/S with an activity of 165 KLU/g |
| CMC: | Sodium carboxymethyl cellulose |
| HEDP: | 1,1-hydroxyethane diphosphonic acid |
| EDDS: | Ethylenediamine-N,N'-disuccinic acid, [S,S] isomer in the form of the sodium salt. |
| PVNO: | Poly(4-vinylpyridine)-N-oxide copolymer of vinylimidaxole and vinylpyrrolidone |
| Granular Suds Suppressor: | 12% Silicone/silica, 18% stearyl alcohol, 70% starch in granular form |

EXAMPLE 1

The following laundry detergent compositions were prepared values being expressed as percentages by weight of the compositions. Composition A is a prior art composition, compositions B to D are in accord with the invention:

| | A | B | C | D |
|---|---|---|---|---|
| 45AS/25AS (3:1) | 9.1 | 9.1 | 9.1 | 9.1 |
| 35AE3S | 2.3 | 2.3 | 2.3 | 2.3 |
| 24E5 | 4.5 | 4.5 | 4.5 | 4.5 |
| TFAA | 2.0 | 2.0 | 2.0 | 2.0 |
| Zeolite A | 13.2 | 13.2 | 13.2 | 13.2 |
| Na SKS-6/citric acid (79:21) | 15.6 | 15.6 | 15.6 | 15.6 |
| Carbonate | 7.6 | 7.6 | 7.6 | 7.6 |
| TAED (fast release particle) | 6.3 | — | — | — |
| TAED (slow release particle) | — | 5.0 | — | 2.3 |
| Benzoyl Caprolactam (slow release particle) | — | — | 5.0 | 2.7 |
| Percarbonate (fast release particle) | 22.5 | — | — | 22.5 |
| Percarbonate (slow release particle) | — | 22.5 | 22.5 | — |
| DETPMP | 0.5 | 0.8 | — | — |
| EDDS (fast release particle) | — | — | 0.3 | 0.75 |

-continued

| | A | B | C | D |
|---|---|---|---|---|
| Protease | 0.55 | 1.27 | 0.55 | 1.27 |
| Lipase | 0.15 | 0.15 | 0.15 | 0.15 |
| Cellulase | 0.28 | 0.28 | 0.28 | 0.28 |
| Amylase | 0.27 | 0.27 | 0.27 | 0.27 |
| Polycarboxylate | 5.1 | 5.1 | 5.1 | 5.1 |
| CMC | 0.4 | 0.4 | 0.4 | 0.4 |
| PVNO | 0.03 | 0.03 | 0.03 | 0.03 |
| Granular suds suppressor | 1.5 | 1.5 | 1.5 | 1.5 |
| Minors/misc to 100% | | | | |

The following T50 values (in seconds) were obtained for each of products A to D:

| T50 | A | B | C | D |
|---|---|---|---|---|
| Peroxyacid | 130 | 190 | 205 | 240 |
| AVO | 95 | 225 | 230 | 115 |
| Surfactant (45AS/25AS and 35AE35) | 90 | 90 | 90 | 60 |

We claim:

1. A detergent composition comprising:

(a) a surfactant;

(b) an organic peroxyacid bleach source; and (c) a polymeric dye transfer inhibiting agent;

wherein a means is provided for delaying the release to a wash solution of said peroxyacid bleach relative to the release of said surfactant such that in the T50 test method herein described the time to achieve a concentration that is 50% of the ultimate concentration of said surfactant is less than 120 seconds and the time to achieve a concentration that is 50% of the ultimate concentration of said peroxyacid bleach is more than 180 seconds.

2. A detergent composition according to claim 1 wherein said organic peroxyacid bleach source comprises:

(i) a hydrogen peroxide source; and (ii) a peroxyacid bleach precursor compound.

3. A detergent composition according to claim 1, comprising from 0.001% to 10%, by weight, polymeric dye transfer inhibiting agent selected from the group consisting of polyamine N-oxide polymers, copolymers of N-vinylpyrrolidone and N-vinylimidazole, polyvinylpyrrolidone polymers and mixtures thereof.

4. A detergent composition according to claim 3, further comprising from 0.005% to 20%, by weight, of a heavy metal sequestrant selected from the group consisting of organic phosphonates, nitrilotriacetic acid and salts thereof, polyaminocarboxylic acids and salts thereof, substituted iminodiacetic acids and mixtures thereof.

5. A detergent composition according to claim 2 wherein said peroxyacid bleach source is a perbenzoic acid precursor compound.

6. A detergent composition according to claim 2 wherein said peroxyacid bleach precursor compound has a cationic charge.

7. A detergent composition according to claim 6 wherein said peroxyacid bleach precursor is 2(N,N,N-trimethyl ammonium) ethyl sodium 4-sulphophenyl carbonate chloride or 4 (trimethyl ammonium) methyl benzoyl oxybenzene sulphonate.

8. A detergent composition according to claim 2 wherein said peroxyacid bleach precursor compound is selected from the group consisting of a) an amide substituted bleach precursor of the general formula:

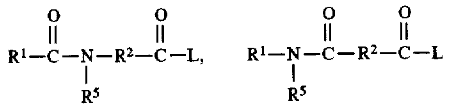

or mixtures thereof, wherein $R^1$ is an alkyl, aryl, or alkaryl group containing from about 1 to about 14 carbon atoms, $R^2$ is an alkylene, arylene or alkarylene group containing from about 1 to about 14 carbon atoms, $R^5$ is H or an alkyl, aryl, or alkaryl group containing from about 1 to about 10 carbon atoms, and L is a leaving group;

b) a benzoxazin-type bleach precursor of the formula:

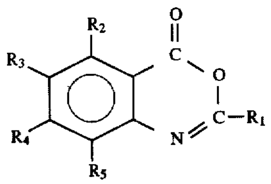

wherein $R_1$ is H, alkyl, alkaryl, aryl, arylalkyl, and wherein $R_3$, $R_4$, and $R_5$ may be the same or different substituents selected from H, halogen, alkyl, alkenyl, aryl, hydroxyl, alkoxyl, amino, alkylamino, $-COOR_6$, wherein $R_6$ is H or an alkyl group and carbonyl functions;

c) an N-acylated lactam bleach precursor of the formula:

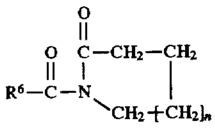

wherein n is from 0 to about 8 and $R^6$ is H, an alkyl, aryl, alkoxyaryl or alkaryl group containing from 1 to 12 carbons, or a substituted phenyl group containing from about 6 to about 18 carbon atoms;

and any mixtures of a), b) and c).

9. A detergent composition according to claim 1 additionally containing a bleach catalyst.

10. A detergent composition according to claim 9 wherein said bleach catalyst is selected from the group consisting of $Mn^{IV}_2(u\text{-}O)_3(1,4,7\text{-trimethyl-}1,4,7\text{-triazacyclononane})_2\text{-}(PF_6)_2$, $Mn^{III}_2(u\text{-}O)_1(u\text{-}OAc)_2(1,4,7\text{-tri-methyl-}1,4,7\text{-triazacyclononane})_2\text{-}(ClO_4)_2$; $Mn^{IV}_4(u\text{-}O)_6(1,4,7\text{-triazacyclononane})_4\text{-}(ClO_4)_2$; $Mn^{III}Mn^{IV}_4(u\text{-}O)_1(u\text{-}OAc)_2$ $(1,4,7\text{-trimethyl-}1,4,7\text{-triazacyclononane})_2\text{-}(ClO_4)_3$; $Mn(1,4,7\text{-trimethyl-}1,4,7\text{-triaza-cyclononane}(OCH_3)_3\text{-}(PF_6)$; Co(2,2'-bispyridyl-amine)$Cl_2$; Di-(isothio-cyanato)bispyridylamine-cobalt (II); trisdipyridylamine-cobalt (II) per-chlorate; Co(2,2-bispyridylamine)$_2$- $O_2ClO_4$; Bis-(2,2'-bispyridylamine) copper(II) per-chlorate; tris(di-2-pyridylamine) iron (II) perchlorate; Mn gluconate; $Mn(CF_3SO_3)_2$; $Co(NH_3)_5Cl$; binuclear Mn complexed with tetra-N-dentate and bi-N-dentate ligands, including $N_4Mn^{III}(u\text{-}O)_2Mn^{IV}N_4)^+$ and $[(Bipy_2Mn^{III}(u\text{-}O)_2Mn^{IV}bipy_2]\text{-}(ClO_4)_3$ and mixtures thereof.

11. A detergent composition according to claim 8 wherein the N-acylated lactam bleach precursor has the formula:

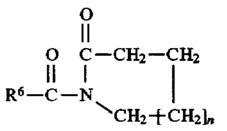

wherein n is from 0 to about 2, and $R^6$ is H, an alkyl, aryl, alkoxyaryl or alkaryl group containing from 1 to 12 carbons, or a substituted phenyl group containing from about 6 to about 18 carbon atoms.

12. A composition according to claim 8, wherein the substituted phenyl group is selected from the group consisting of phenyl groups containing a moiety selected from the group consisting of chloro, fluoro, nitro, amino alkyls, alkyl, alkoxys, aryls, and mixtures thereof.

13. A detergent composition comprising:

(a) a surfactant;

(b) an organic peroxyacid bleach source; and (c) a heavy metal sequestrant selected from the group consisting of organic phosphonates, nitrilotriacetic acid and salts thereof, polyaminocarboxylic acids and salts thereof, substituted iminodiacetic acids and mixtures thereof;

wherein a means is provided for delaying the release to a wash solution of said peroxyacid bleach relative to the release of said surfactant such that in the T50 test method herein described the time to achieve a concentration that is 50% of the ultimate concentration of said surfactant is at least 100 seconds less than the time to achieve a concentration that is 50% of the ultimate concentration of said peroxyacid bleach.

14. A detergent composition according to claim 13, comprising from 0.005% to 20%, by weight, of a heavy metal sequestrant selected from the group consisting of diethylene triamine penta (methylene phosphonate), ethylene diamine tri (methylene phosphonate), hexamethylene diamine tetra (methylene phosphonate), hydroxy-ethylene 1, 1 diphosphonate, ethylenediaminetetracetic acid and salts thereof, ethylenetriamine pentacetic acid and salts thereof, ethylenediamine disuccinic acid and salts thereof, ethylenediamine diglutaric acid and salts thereof, 2-hydroxypropylenediamine disuccinic acid and salts thereof, and mixtures thereof.

15. A detergent composition according to claim 13, further comprising from 0.001% to 10%, by weight, polymeric dye transfer inhibiting agent selected from the group consisting of polyamine N-oxide polymers, copolymers of N-vinylpyrrolidone and N-vinylimidazole, polyvinylpyrrolidone polymers and mixtures thereof.

16. A detergent composition according to claim 13, wherein the organic peroxyacid bleach source comprises:

(i) a hydrogen peroxide source; and (ii) a peroxyacid bleach precursor compound.

17. A detergent composition comprising:

(a) a surfactant; and (b) an organic peroxyacid bleach source comprising an inorganic perhydrate bleach and a peroxyacid precursor;

wherein a means is provided for delaying the release to a wash liquor of the peroxyacid bleach relative to the release of the surfactant such that in the T50 test method herein described the time to achieve a concentration that is 50% of the ultimate concentration of the surfactant is at least 100 seconds less than the time to achieve a concentration that is 50% of the ultimate concentration of the peroxyacid bleach; and wherein after the ultimate concentrations of surfactant, inorganic perhydrate bleach and peroxyacid precursor are achieved, the wash liquor comprises, by weight, from 0.005% to 0.4% surfactant, more than 0.05% inorganic perhydrate bleach, and from 0.001% to 0.08% peroxyacid precursor.

18. A detergent composition according to claim 17, wherein the composition further comprises from 0.001% to 10%, by weight, of a polymeric dye transfer inhibiting agent selected from the group consisting of polyamine N-oxide polymers, copolymers of N-vinylpyrrolidone and N-vinylimidazole, polyvinylpyrrolidone polymers and mixtures thereof.

19. A detergent composition according to claim 18, further comprising from 0.05% to 10%, by weight, of a granular suds suppressor comprising polydimethyl siloxane, silica, and starch.

20. A detergent composition according to claim 17, wherein the peroxyacid bleach precursor compound is selected from the group consisting of:

a) an amide substituted bleach precursor of the general formula:

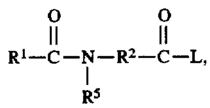 or 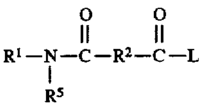

wherein $R^1$ is an alkyl, aryl, or alkaryl group containing from about 1 to about 14 carbon atoms, $R^2$ is an alkylene, arylene or alkarylene group containing from about 1 to about 14 carbon atoms, $R^5$ is H or an alkyl, aryl, or alkaryl group containing from about 1 to about 10 carbon atoms, and L is a leaving group;

b) a benzoxazin-type bleach precursor of the formula:

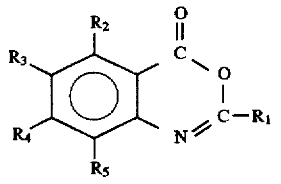

wherein $R_1$ is H, alkyl, alkaryl, aryl, arylalkyl, and wherein $R_2$, $R_3$, $R_4$ and $R_5$ may be the same or different substituents selected from H, halogen, alkyl, alkenyl, aryl, hydroxyl, alkoxyl, amino, alkylamino, —$COOR_6$ wherein $R_6$ is H or an alkyl group, and carbonyl functions;

c) an N-acylated lactam bleach precursor of the formula:

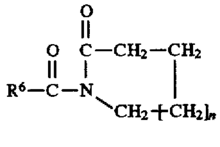

wherein n is from 0 to about 8, and $R^6$ is H, an alkyl, aryl, alkoxyaryl or alkaryl group containing from 1 to 12 carbons, or a substituted phenyl group containing from about 6 to about 18 carbon atoms;

d) N,N,N',N'-tetra acetylated alkylene diamines wherein the alkylene group contains from 1 to 6 carbon atoms; and e) mixtures thereof.

21. A composition according to claim 20, wherein the substituted phenyl group is selected from the group consisting of phenyl groups containing a moiety selected from the group consisting of chloro, fluoro, nitro, amino alkyls, alkyl, alkoxys, aryls, and mixtures thereof.

22. A method of improving color stability of fabrics during washing comprising the steps of:

(1) applying a bleach-free solution of a composition containing a surfactant to a soiled substrate;

(2) allowing said solution to remain in contact with said soiled substrate for an effective time interval; and (3) washing said soiled substrate using a wash liquor comprising more than 0.05%, by weight, inorganic perhydrate bleach and from 0.001% to 0.08%, by weight, peroxyacid precursor.

23. A method according to claim 22, wherein the wash liquor further comprises polymeric dye transfer inhibiting agent selected from the group consisting of polyamine N-oxide polymers, copolymers of N-vinylpyrrolidone and N-vinylimidazole, polyvinylpyrrolidone polymers and mixtures thereof.

24. A method according to claim 22 wherein the effective time interval is from 10 seconds to 1800 seconds.

* * * * *